United States Patent
Shtilerman

(10) Patent No.: US 11,252,987 B2
(45) Date of Patent: Feb. 22, 2022

(54) APPARATUS FOR FORMING A ROLLED FOOD PRODUCT

(71) Applicant: Solbern Inc., Fairfield, NJ (US)

(72) Inventor: Moysey Shtilerman, Elmwood Park, NJ (US)

(73) Assignee: Solbern Inc., Fairfield, NJ (US)

( * ) Notice: Subject to any disclaimer, the term of this patent is extended or adjusted under 35 U.S.C. 154(b) by 145 days.

(21) Appl. No.: 16/174,534

(22) Filed: Oct. 30, 2018

(65) Prior Publication Data

US 2019/0124969 A1  May 2, 2019

Related U.S. Application Data

(60) Provisional application No. 62/580,696, filed on Nov. 2, 2017.

(51) Int. Cl.
  *A23P 20/20* (2016.01)
  *A21C 9/06* (2006.01)
  *A21C 3/06* (2006.01)

(52) U.S. Cl.
  CPC .............. *A23P 20/20* (2016.08); *A21C 3/06* (2013.01); *A21C 9/063* (2013.01)

(58) Field of Classification Search
  CPC .. A21C 3/06; A21C 3/065; A21C 3/02; A21C 9/063; A21C 9/045; A23P 20/20
  See application file for complete search history.

(56) References Cited

U.S. PATENT DOCUMENTS

| | | | | |
|---|---|---|---|---|
| 3,704,664 A | * | 12/1972 | Fisher, Jr. | A21C 3/06 99/450.2 |
| 3,861,291 A | * | 1/1975 | Guzaski | A21C 9/063 99/450.2 |
| 4,491,601 A | * | 1/1985 | Bernal | A23P 20/20 426/297 |

(Continued)

FOREIGN PATENT DOCUMENTS

| | | |
|---|---|---|
| EP | 0230335 B1 | 10/1991 |
| EP | 2201849 A1 | 6/2010 |

(Continued)

OTHER PUBLICATIONS

Excerpt from operating manual for BF-2 Folder entitled "Operating Instructions," publicly known prior to Nov. 2, 2016 (2 pages) [Applicant-Admitted Art].

*Primary Examiner* — Seyed Masoud Malekzadeh

(74) *Attorney, Agent, or Firm* — McCarter & English, LLP

(57) ABSTRACT

Exemplary embodiments are directed to an apparatus for forming a rolled food product, generally including a transport section and a rolling section. The transport section is configured to receive a food product in an unrolled configuration. The rolling mechanism includes rolling elements positionable between an active position in which the rolling elements are disposed over at least a portion of the transport section, and a retracted position in which the rolling elements are actuated away from the transport section. The transport section is configured to feed the food product in the unrolled configuration to the rolling mechanism. The rolling mechanism is configured to roll the food product into a partially rolled food product. Rolling of the partially rolled food product into a fully rolled food product is completed by the transport section.

17 Claims, 18 Drawing Sheets

(56) References Cited

U.S. PATENT DOCUMENTS

| | | | | |
|---|---|---|---|---|
| 4,555,226 | A | * | 11/1985 | Benier ............... A21C 3/06 425/101 |
| 4,748,793 | A | | 6/1988 | Brookman |
| 4,882,175 | A | * | 11/1989 | Ream ................. A21C 3/06 426/5 |
| 5,205,106 | A | | 4/1993 | Zimmermann et al. |
| 5,284,667 | A | | 2/1994 | Zimmermann et al. |
| 5,455,053 | A | | 10/1995 | Zimmermann et al. |
| 5,516,542 | A | | 5/1996 | Zimmermann et al. |
| 5,723,163 | A | | 3/1998 | Zimmermann et al. |
| 5,738,896 | A | * | 4/1998 | Cassetta ............. A21C 3/06 426/128 |
| 5,780,091 | A | * | 7/1998 | Cassetta ............. A23L 7/11 426/128 |
| 6,349,635 | B2 | * | 2/2002 | Taguchi ............. A21C 3/06 425/115 |
| 6,783,786 | B1 | * | 8/2004 | Cunningham ....... A21C 3/06 426/501 |
| 6,860,195 | B2 | | 3/2005 | Cunningham et al. |
| 8,353,742 | B1 | * | 1/2013 | Choi ................... A21C 3/06 452/32 |
| 8,961,165 | B2 | * | 2/2015 | Van Blokland ..... A21C 3/06 425/319 |
| 2002/0187236 | A1 | * | 12/2002 | Kaiser ................. A23P 20/20 426/572 |
| 2003/0118684 | A1 | * | 6/2003 | Finkowski .......... A21C 9/063 425/208 |
| 2004/0151800 | A1 | * | 8/2004 | Bachand .............. A23G 3/50 426/5 |
| 2006/0144254 | A1 | * | 7/2006 | Foulon, Jr. .......... A23P 20/20 99/450.4 |
| 2006/0216389 | A1 | | 9/2006 | Schonauer et al. |
| 2010/0247729 | A1 | * | 9/2010 | Van Blokland ..... A21C 3/06 426/502 |
| 2013/0224355 | A1 | | 8/2013 | Bernhardt |
| 2015/0128817 | A1 | * | 5/2015 | Berger ................. A21C 9/088 99/450.6 |
| 2015/0306778 | A1 | * | 10/2015 | Al Afandi ........... B65B 41/16 426/315 |
| 2018/0077940 | A1 | * | 3/2018 | DeVito ................ B26D 3/11 |
| 2018/0146686 | A1 | * | 5/2018 | Choi .................... A23P 20/20 |

FOREIGN PATENT DOCUMENTS

| | | |
|---|---|---|
| WO | 97/02750 A1 | 1/1997 |
| WO | 97/33822 A1 | 9/1997 |

* cited by examiner

APPARATUS FOR FORMING A ROLLED FOOD PRODUCT

CROSS-REFERENCE TO RELATED APPLICATIONS

This application claims the priority benefit of U.S. Provisional Patent Application No. 62/580,696, filed on Nov. 2, 2017. The entire content of the foregoing provisional patent application is incorporated herein by reference.

TECHNICAL FIELD

The present disclosure relates to an apparatus for forming a food product and, in particular, to an apparatus including laterally retractable elements for forming a rolled food product.

BACKGROUND

A variety of methods of forming food products are known in the industry. For example, manual forming operations can be used. Manual forming operations can be labor intensive and involve a high degree of dexterity to ensure the food product is rolled tightly enough. The time undertaken by an operator to layer and roll multiple food products to produce a rolled food product also limits the production rate where the forming operations are carried out by hand.

A need remains for an apparatus for forming rolled food products in a uniform and time-efficient manner. These and other considerations are addressed by embodiments of the apparatus for forming a rolled food product of the present disclosure.

SUMMARY

In accordance with embodiments of the present disclosure, an exemplary apparatus for forming a rolled food product is provided that generally includes a transport section and a rolling mechanism. The transport section can be configured to receive a food product in an unrolled configuration. The rolling mechanism can be disposed over a portion of the transport section and includes rolling elements. The rolling elements can be positionable between an active position in which the rolling elements are disposed over at least a portion of the transport section, and a retracted position in which the rolling elements are actuated away from the transport section. The transport section can be configured to feed the food product in the unrolled configuration to the rolling mechanism. The rolling mechanism can be configured to roll the food product into a partially rolled food product. Rolling of the partially rolled food product into a fully rolled food product is completed by the transport section.

The rolling mechanism can be configured to roll the food product into the partially rolled food product with the rolling elements in the active position. The rolling elements are configured to be actuated into the retracted position while the food product is in the partially rolled food product configuration. Rolling of the food product into a fully rolled configuration can be completed by the transport section with the assistance (e.g., downwardly directed pressure) of a retention mechanism. Positioning of the rolling elements from the active position to the retracted position can include actuating the rolling elements to laterally move away from the transport section and from each other. The transport section can include a conveyor belt assembly including a first conveyor belt and a second conveyor belt. The first and second conveyor belts can be disposed substantially adjacent to each other with a gap therebetween. The first and second conveyor belts can extend from a point at or near a proximal end of the apparatus to a point at or near a distal end of the apparatus.

The rolling mechanism can include first and second lever arms disposed on opposing sides of the transport section. The rolling elements can be rotatably coupled to the respective first and second lever arms. The apparatus can include a processing device and/or controller in electronic communication with components of the apparatus. The processing device and/or controller can be configured to coordinate rotation of the first and second lever arms about respective pivot points to position the rolling elements in the active position or the retracted position.

The rolling elements each include a fork-shaped element with two prongs and a space between the two prongs. The apparatus includes a sensor assembly disposed over the transport section. The sensor assembly includes a first sensor and a second sensor. The second sensor can be disposed distally from the first sensor. The first and second sensors can be configured to sequentially detect a leading edge of the food product in the unfolded configuration during feeding of the food product by the transport section towards the rolling mechanism. The second sensor can be configured to detect the food product in the unfolded configuration during feeding of the food product by the transport section towards the rolling mechanism after the trailing edge has passed the first sensor. Detection of the food product by the second sensor corresponds with the leading edge of the food product being positioned at the rolling elements, thereby providing a window or time period for actuation of the rolling mechanism (e.g., when the trailing edge of the food product is between the first and second sensors and the leading edge is at the rolling elements).

The apparatus can include a spring-loaded or biased platform disposed proximally from the rolling mechanism and between the first and second conveyor belts of the transport section. The biased platform can be positionable in a first position prior to leading with the food product, a trailing edge of the biased platform being disposed higher than a lower prong of the rolling elements in the first position. The biased platform can be positionable in a second position after loading with the food product, the trailing edge of the biased platform being disposed equal to or lower than the lower prong of the rolling elements in the second position. The apparatus can include a retention mechanism disposed over a portion of the distal end of the transport section. The retention mechanism can maintain pressure on the food product to assist the transport section in completing rolling of the food product into the fully rolled food product. The retention mechanism can also maintain pressure on the food product during initial rolling of the food product with the rolling elements, thereby ensuring a tight roll of the food product.

In accordance with embodiments of the present disclosure, an exemplary apparatus for forming a rolled food product is provided that generally includes a transport section and a rolling mechanism. The transport section can be configured to receive a food product in an unrolled configuration. The rolling mechanism can be disposed over the transport section and includes rolling elements. The rolling elements can be positionable between an active position in which the rolling elements are disposed over at least a portion of the transport section, and a retracted position in which the rolling elements are actuated laterally away from the transport section. The transport section can be configured to feed the food product in the unrolled configuration to the rolling mechanism. The rolling mechanism can be configured to roll the food product into a partially rolled food product with the rolling elements in the active position. The rolling elements can be actuated into the retracted position while the food product is in the partially rolled food product configuration. Rolling of the partially rolled food product into a fully rolled food product can be completed by the transport section.

In accordance with embodiments of the present disclosure, an exemplary method of forming a rolled food product is provided. The method includes positioning a food product in an unrolled configuration on a transport section of an apparatus. The apparatus includes a rolling mechanism disposed over the transport section. The rolling mechanism includes rolling elements positionable between an active position in which the rolling elements are disposed over at least a portion of the transport section, and a retracted position in which the rolling elements are actuated away from the transport section. The method includes actuating the rolling elements of the rolling mechanism into the active position. The method includes feeding the food product in the unrolled configuration to the rolling mechanism with the transport section. The method includes rolling the food product into a partially rolled food product with the rolling elements of the rolling mechanism in the active position. The method includes completing rolling of the partially rolled food product into a fully rolled food product with the transport section.

In some embodiments, the method includes rolling the food product into the partially rolled food product with the rolling elements in the active position. The method includes actuating the rolling elements into the retracted position while the food product is in the partially rolled food product configuration. The method includes completing rolling of the food product into the fully rolled food product configuration with the transport section.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed exemplary embodiment of an apparatus for forming a rolled food product, reference is made to the accompanying figures, wherein.

DESCRIPTION OF EXEMPLARY EMBODIMENTS

It should be understood that the relative terminology used herein, such as "front", "rear", "left", "top", "bottom", "vertical", and "horizontal" is solely for the purposes of clarity and designation and is not intended to limit the invention to embodiments having a particular position and/or orientation. Accordingly, such relative terminology should not be construed to limit the scope of the present invention. In addition, it should be understood that the invention is not limited to embodiments having specific dimensions. Thus, any dimensions provided herein are merely for an exemplary purpose and are not intended to limit the invention to embodiments having particular dimensions.

Figure 9:
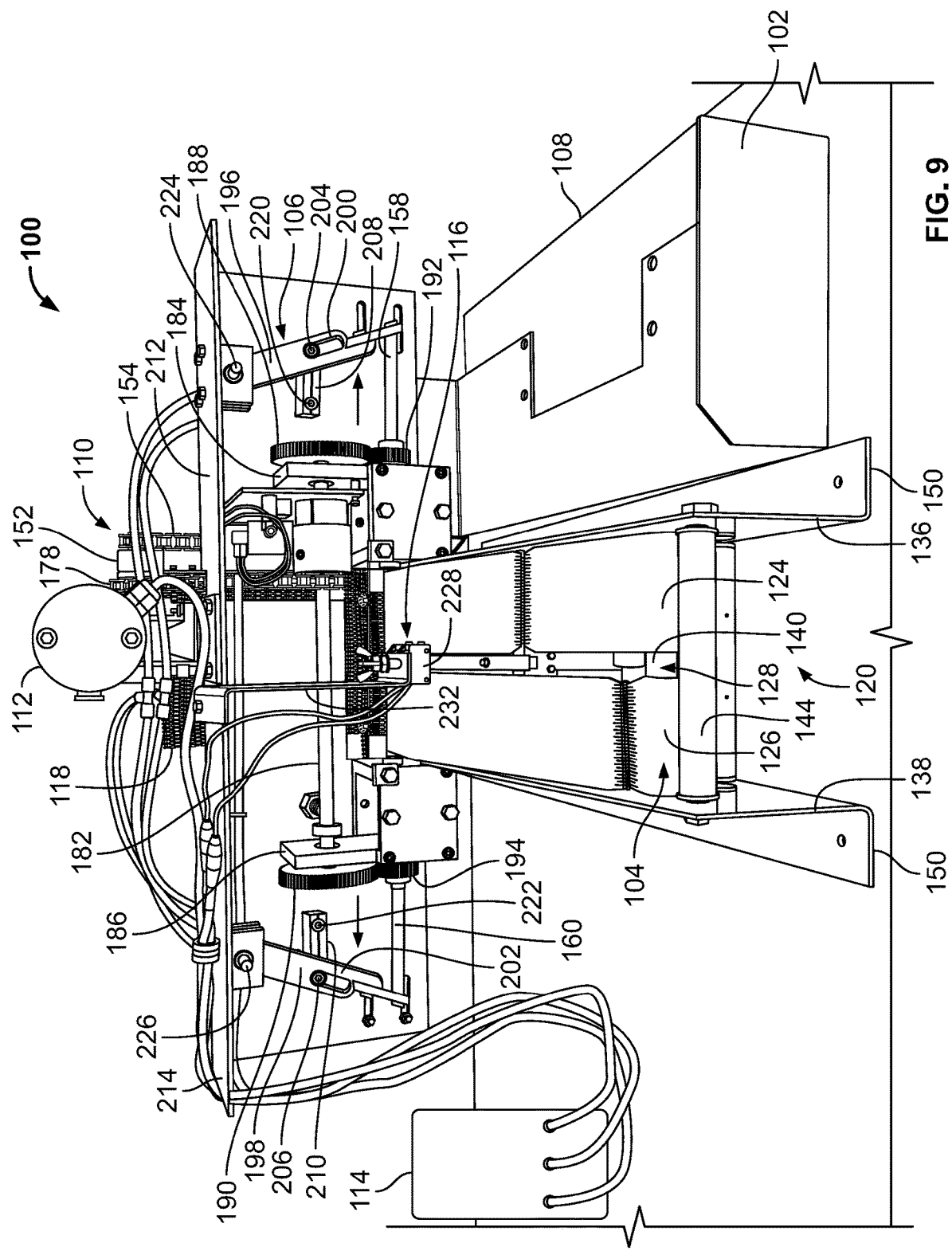
FIG. 9 is a front view of the example embodiment of FIG. 1, including rolled elements actuated into laterally retracted positions.

With reference to FIGS. 1-9, perspective, front, side, rear and detailed views of an embodiment of an apparatus 100 for forming a food product, e.g., a rolled food product folding apparatus, are provided. In particular, FIGS. 1-8 show the apparatus 100 with rolling elements 158, 160 in an active position, while FIG. 9 shows the apparatus 100 with the rolling elements 158, 160 in a retracted position. FIGS. 5-8 further show detailed views of the sensor assembly 116 and rolling mechanism 106 of the apparatus 100. The apparatus 100 generally includes a base or frame 102, a transport section 104, and a rolling mechanism 106. The frame 102 can include one or more structural elements mounted to a support structure 108 to provide stability to the apparatus 100. The transport section 104 can be coupled to the frame 102.

As shown in FIGS. 1-4, 8 and 9, the apparatus 100 generally includes a driving section 110 including a motor 112, and a controller 114 in communication with the driving section 110. In some embodiments, the controller 114 can be in the form of a computing system or processing device capable of receiving input from a user, e.g., through a graphical user interface, for regulating the apparatus 100, and can display programmable settings to the user via the graphical user interface. The controller 114 can synchronize or coordinate actuation of the transport section 104 and the rolling mechanism 106 to form the rolled food product. Thus, the controller 114 provides an automated interface for forming the rolled food product with the apparatus 100. The apparatus 100 generally includes a sensor assembly 116 disposed over a portion of the transport section 104, and a retention mechanism 118 configured to assist in formation of the rolled food product.

The apparatus 100 includes a proximal end 120 at which the food product is introduced to the apparatus 100 in an unrolled (e.g., substantially flat) configuration. In some embodiments, the food product can be in the form of a substantially flat slice of deli meat disposed over a substantially flat slice of cheese. The apparatus 100 includes distal end 122 on the opposing side of the apparatus 100 from the proximal end 120. The food product in the fully rolled configuration is output from the apparatus 100 at or near the distal end 122. The rolling mechanism 106 is disposed at a point between the proximal and distal ends 120, 122 such that the food product can be at least partially rolled by the rolling mechanism 106.

As shown in FIGS. 1-4, the transport section 104 can be in the form of a double conveyor belt assembly including a first conveyor belt 124 and a second conveyor belt 126. The first and second conveyor belts 124, 126 can be positioned substantially adjacent to each other and both extend from a point at or near the proximal end 120 to a point at or near the distal end 122 of the apparatus 100. The first and second conveyor belts 124, 126 can therefore extend substantially aligned and parallel with each other. The first and second conveyor belts 124, 126 are spaced from each other by a gap 128 along the length of the transport section 104. The width of the gap 128 is dimensioned to accommodate a spring-loaded or biased platform 130, while being sufficiently narrow to prevent the food product from dropping through the gap 128. The biased platform 130 can be disposed between the first and second conveyor belts 124, 126 and near the rolling mechanism 106. Operation of the biased platform 130 will be discussed in greater detail below.

Although illustrated as single belts that extend from the proximal to the distal ends 120, 122, in some embodiments, the first and second conveyor belts 124, 126 can each be replaced with two or more conveyor belts. In some embodiments, the first and/or second conveyor belts 124, 126 can include perforations or openings 132, 134 formed therein configured to assist in maintaining the position of the food product on the conveyor belts 124, 126 (e.g., by enhancing grip or traction). In some embodiments, a vacuum "shoe" (not shown) can be used in combination with the conveyor belts 124, 126 (particularly the openings 132, 134 in the conveyor belts 124, 126) to hold the food product against the conveyor belts 124, 126 and avoid slipping or sliding. For example, suction from the vacuum "shoe" through the openings 132, 134 imparts a force on the food product to hold the food product against the outer surface of the conveyor belt 124, 126. In some embodiments, rather than or in addition to the openings 132, 134, the conveyor belts 124, 126 can include textured or raised surfaces to provide for an improved grip of the food product. Such surfaces of the conveyor belts 124, 126 assist in preventing or reducing shifting of the food product during operation of the apparatus 100.

As shown in FIGS. 1-4, the apparatus 100 includes supporting flanges 136, 138 disposed on opposing sides of the transport section 104. The flanges 136, 138 can be fixedly coupled to the frame 102 and/or the support structure 108. The transport section 104 includes a proximal roller 140 rotatably mounted to the flanges 136, 138 at or near the proximal end 120, with the proximal roller 140 extending laterally or perpendicularly relative to the conveyor belts 124, 126. The transport section 104 includes a distal roller 142 rotatably mounted to the flanges 136, 138 at or near the distal end 122, with the distal roller 142 extending laterally or perpendicularly relative to the conveyor belts 124, 126. In some embodiments, one or more additional rollers 144, 146 can be mounted between the flanges 136, 138 at the proximal and distal ends 120, 122 to allow for adjustment of the overall length of the transport section 104. The transport section 104 includes a central roller 148 rotatably mounted to the flanges 136, 138 at a position between the proximal and distal ends 120, 122 and, particularly, at or near the rolling mechanism 106.

Mounting of the proximal roller 140, the distal roller 142, and the central roller 148 to the flanges 136, 138 can be offset vertically (e.g., by an elevational distance) as measured from the bottom edge or surface 150 of the flange 136, 138. The vertically offset rollers 140, 142, 148 results in the distal roller 142 mounted at the lowest elevational distance ($X_1$) from the bottom edge or surface 150 of the flange 136 ($X_0=0$), the central roller 148 mounted at the highest elevational distance ($X_3$) from the bottom edge 150 of the flange 136, and the proximal roller 140 mounted at an elevational distance ($X_2$) between the distal and central rollers 142, 148, such that $X_3 > X_2 > X_1 \geq X_0$. In particular, the distal roller 142 is mounted at the lowest height, i.e., the lowest elevational distance $X_1$ from the bottom surface 150 ($X_0$), the central roller 148 is mounted at the highest height, i.e., the highest elevational distance $X_3$ from the bottom surface 150 ($X_0$), and the proximal roller 140 is mounted at a medium height, i.e., the medium elevational distance $X_2$ from the bottom surface 150 ($X_0$). The conveyor belts 124, 126 are therefore sloped in an upward direction between the proximal roller 140 and the central roller 148, and sloped in a downward direction between the central roller 148 and the distal roller 142.

As shown in FIGS. 1-4, 8 and 9, the apparatus 100 includes a shaft 152 mechanically coupled to the motor 112 such that the motor 112 drives axial rotation of the shaft 152. One end of the shaft 152 includes a gear to drive rotation of a chain 154. The chain 154 can be meshed with a gear 156 mechanically coupled to the distal roller 142. Thus, rotation of the shaft 152 rotates the chain 154 which, in turn, rotates the gear 156. Rotation of the gear 156 results in rotation of the distal roller 142 in a clockwise direction. Due to the tension of the conveyor belts 124, 126 stretched between the proximal and distal rollers 140, 142, rotation of the distal roller 142 actuates clockwise rotation of the conveyor belts 124, 126. Clockwise rotation of the conveyor belts 124, 126 feeds the unrolled food product positioned on the conveyor belts 124, 126 at or near the proximal end 120 towards the rolling mechanism 106.

As shown in FIGS. 5-9, the rolling mechanism 106 includes two rolling elements 158, 160 configured to be actuated into an active position (e.g., a first position) over the respective conveyor belts 124, 126 (see, e.g., FIG. 2), and an inactive or retracted position (e.g., a second position) laterally spaced away from the respective conveyor belts 124, 126 (see, e.g., FIG. 9). As will be discussed in greater detail below with respect to FIGS. 1-4, the apparatus 100 includes lever arms 196, 198 mechanically coupled to the respective rolling elements 158, 160. The lever arms 196, 198 are, in turn, mechanically coupled to brackets 208, 210 that are configured to be rotated by actuators 216, 218. Rotation of the brackets 208, 210 in opposing first directions laterally moves the lever arms 196, 198 in opposing directions (e.g., away from each other) which, in turn, positions the rolling elements 158, 160 in the retracted position. Rotation of the brackets 208, 210 in opposing second directions laterally moves the lever arms 196, 198 toward each other which, in turn, positions the rolling elements 158, 160 in the active position.

Figure 1:
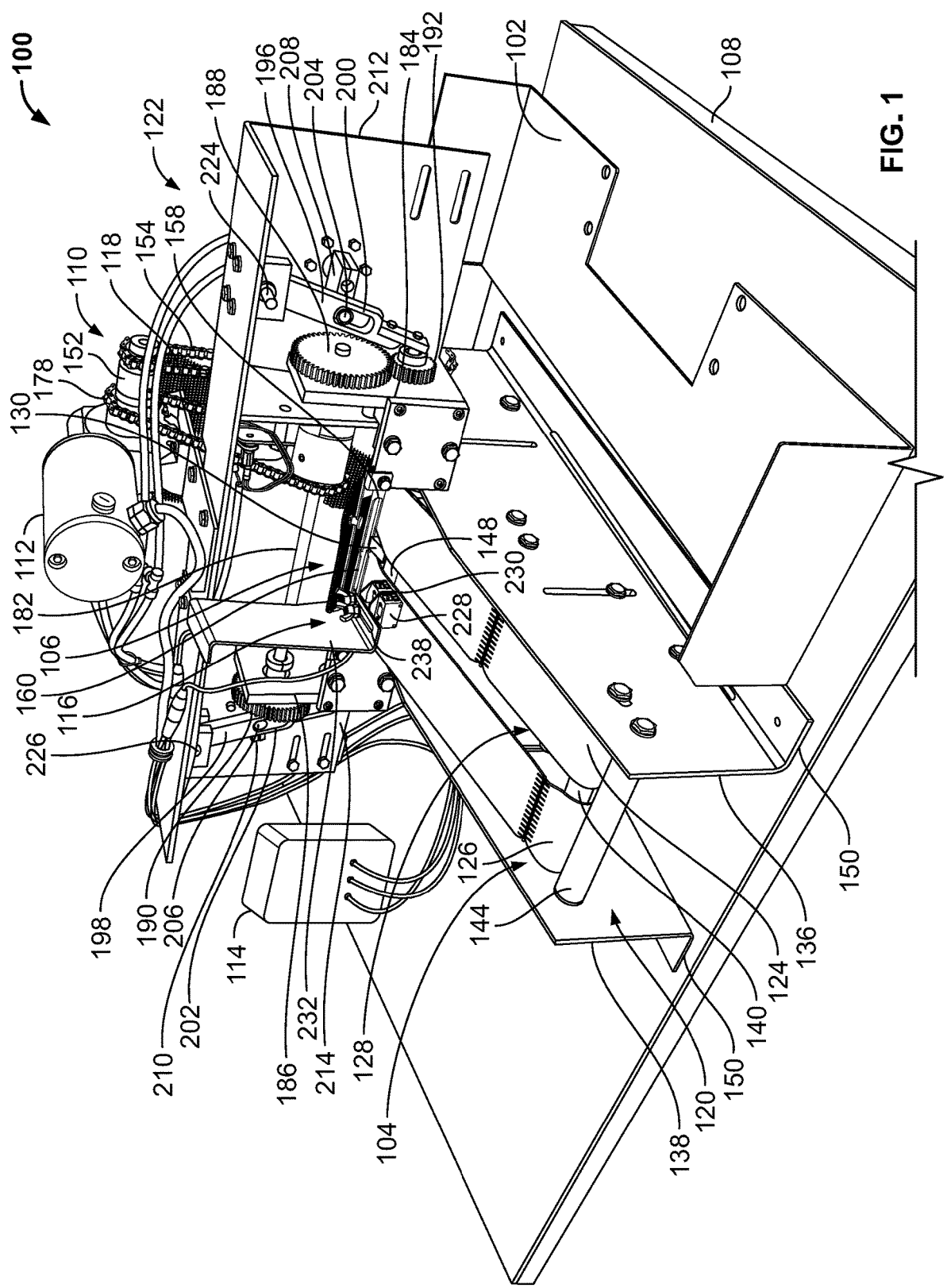
FIG. 1 is a front perspective view of an example embodiment of an apparatus for folding a rolled food product according to the present disclosure.
Figure 2:
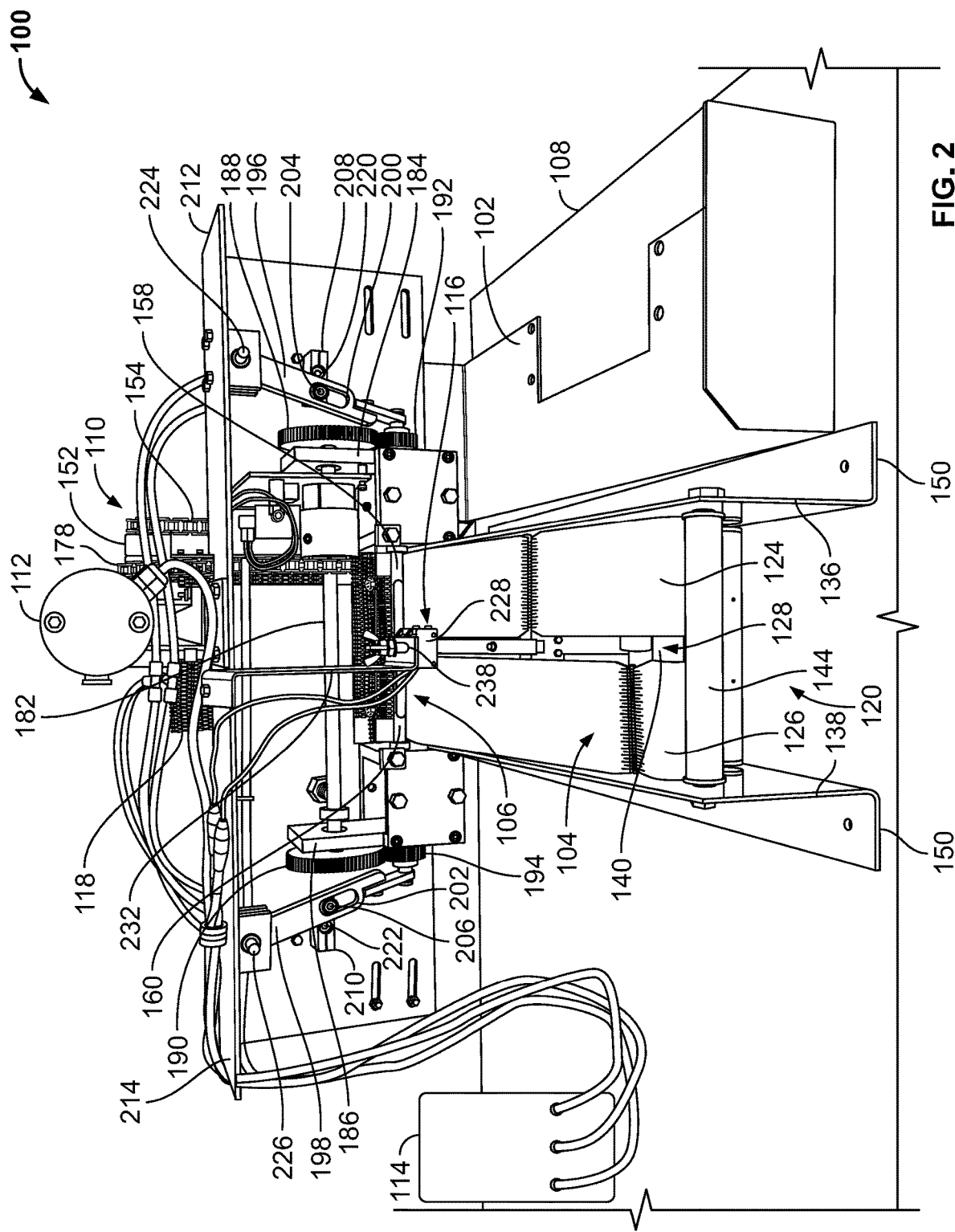
FIG. 2 is a front view of the example embodiment of FIG. 1.
Figure 3:
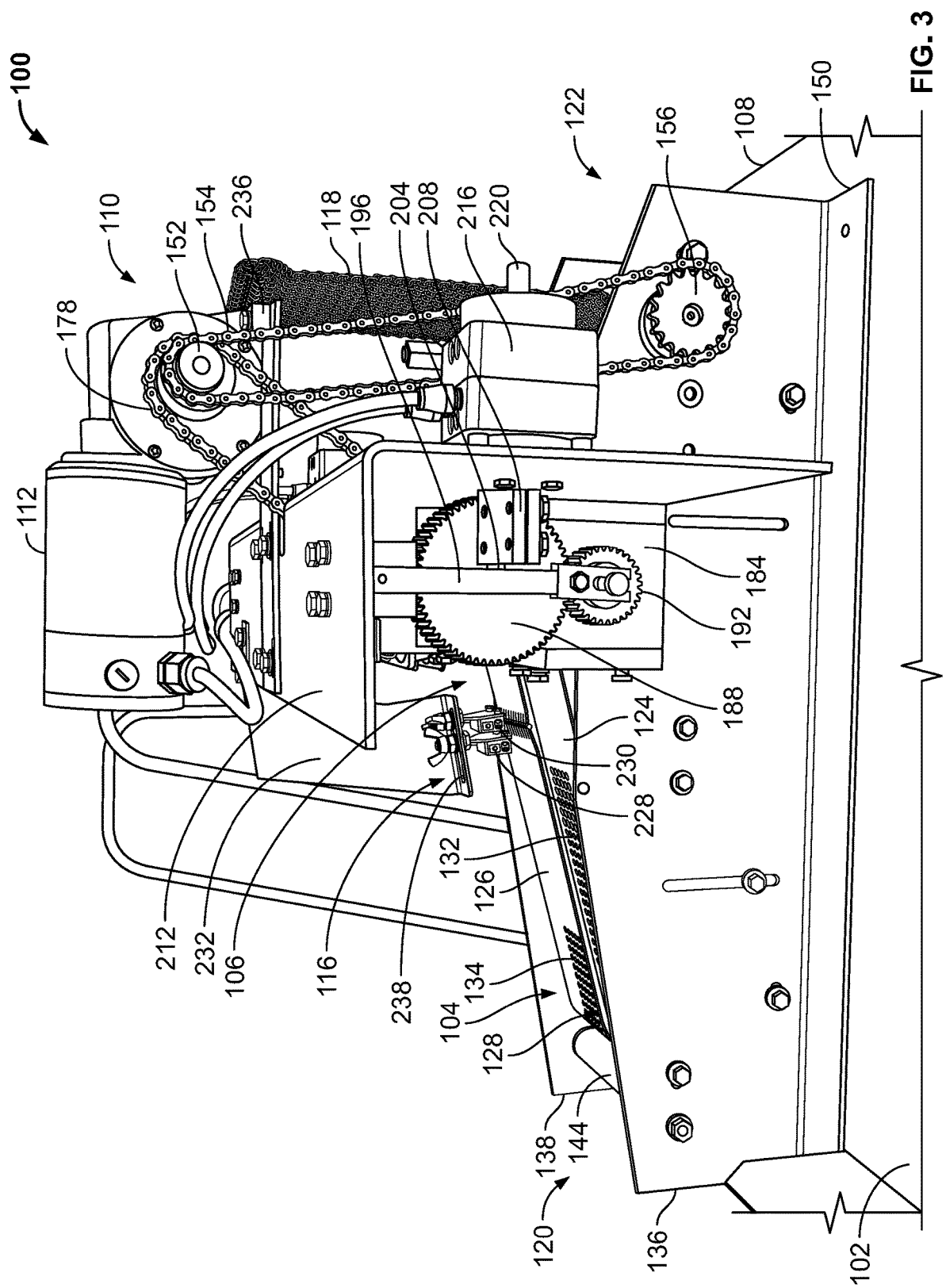
FIG. 3 is a side view of the example embodiment of FIG. 1.
Figure 4:
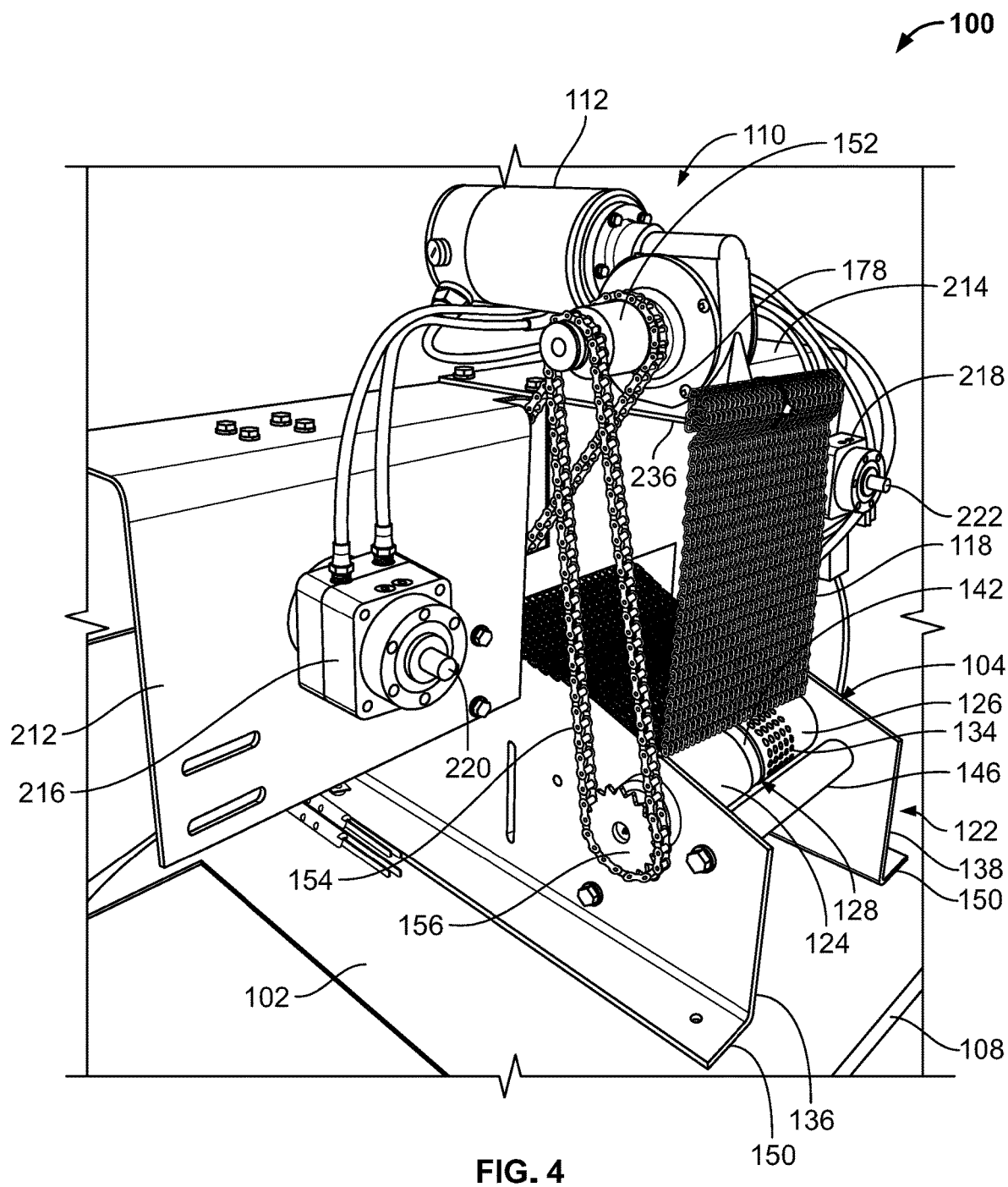
FIG. 4 is a rear perspective view of the example embodiment of FIG. 1.
Figure 5:
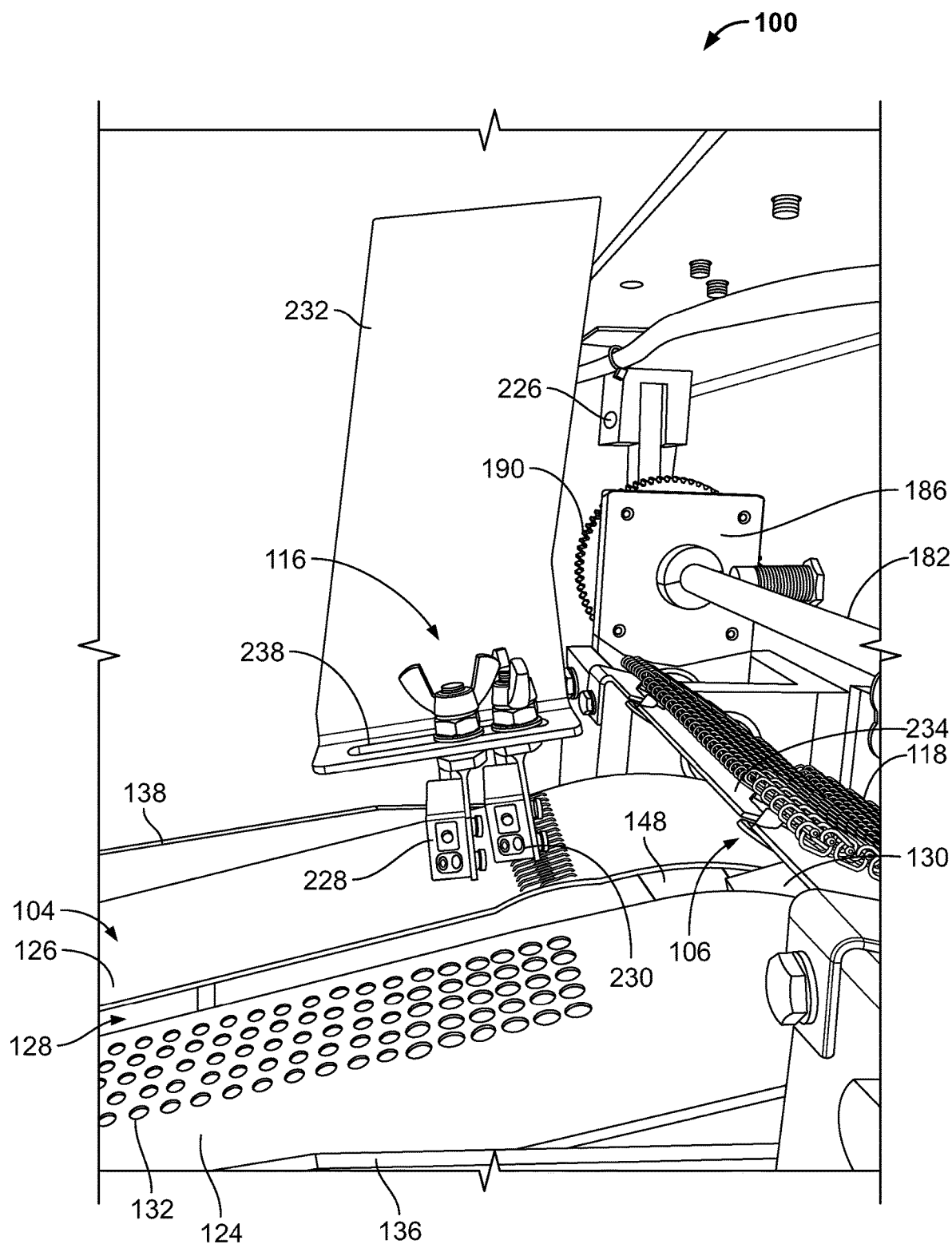
FIG. 5 is a detailed, side view of a sensor assembly and rolling mechanism of the example embodiment of FIG. 1.
Figure 6:
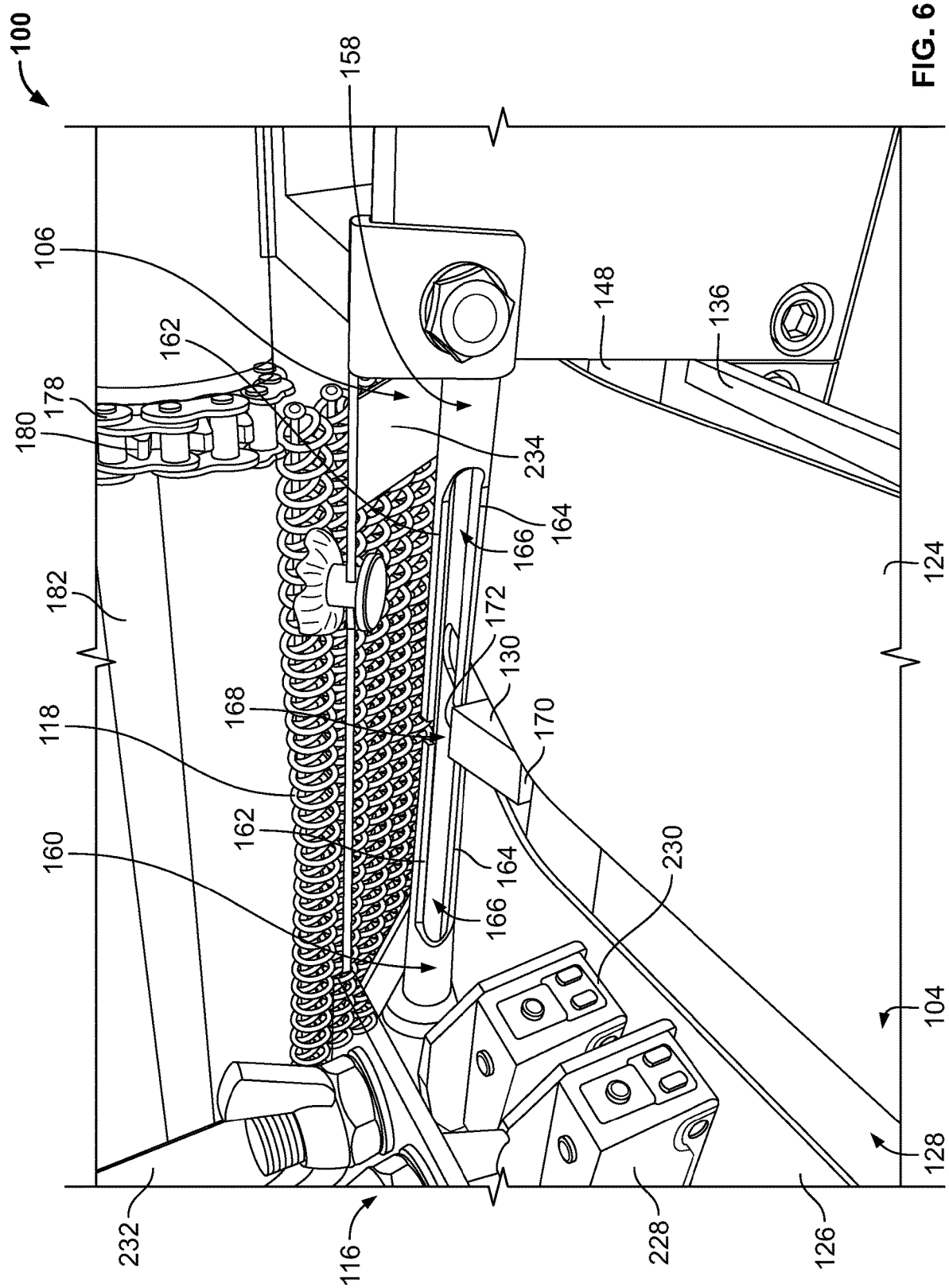
FIG. 6 is a detailed, front perspective view of a rolling mechanism of the example embodiment of FIG. 1.
Figure 7:
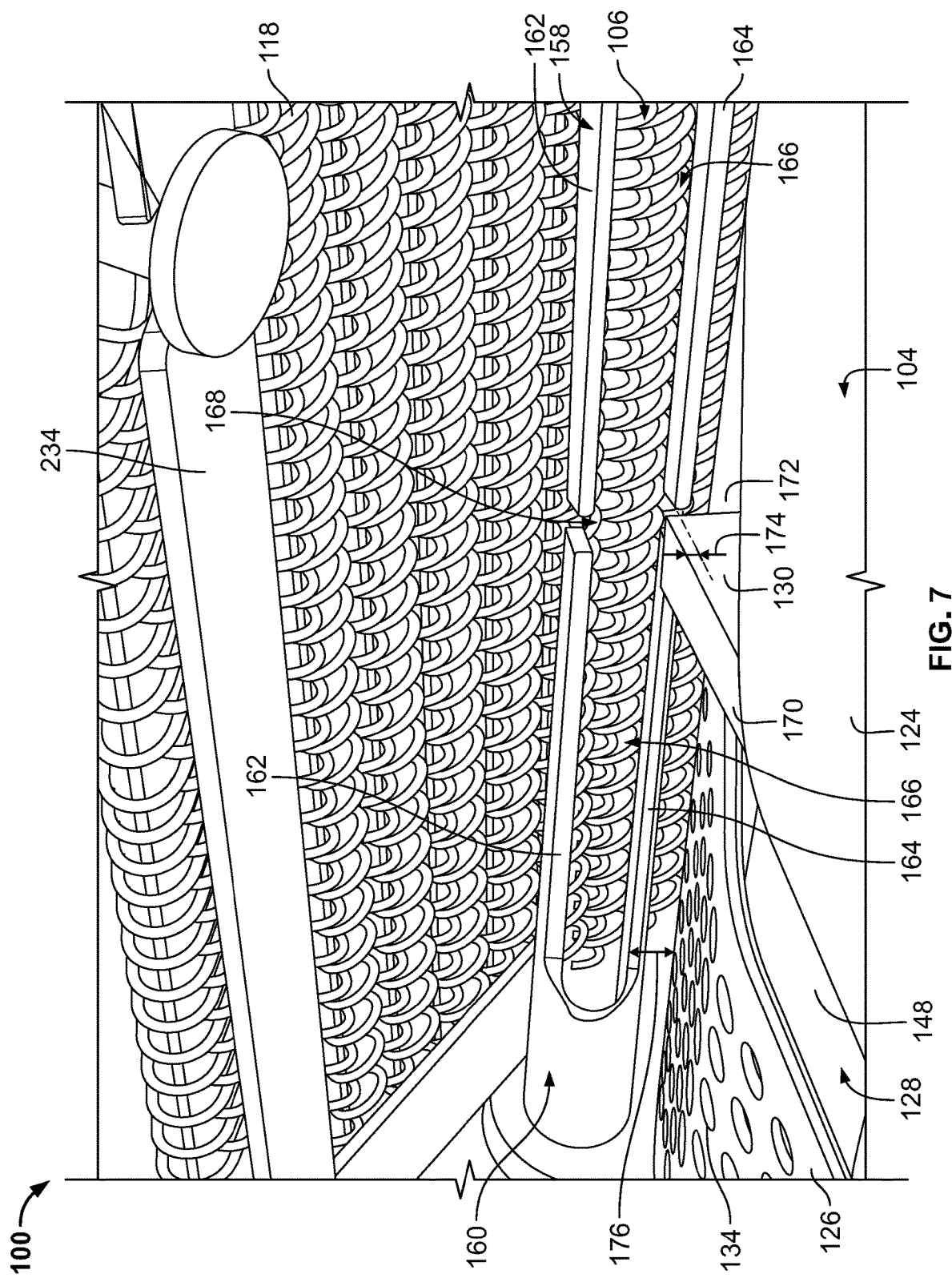
FIG. 7 is a detailed, front perspective view of a rolling mechanism of the example embodiment of FIG. 1.
Figure 8:
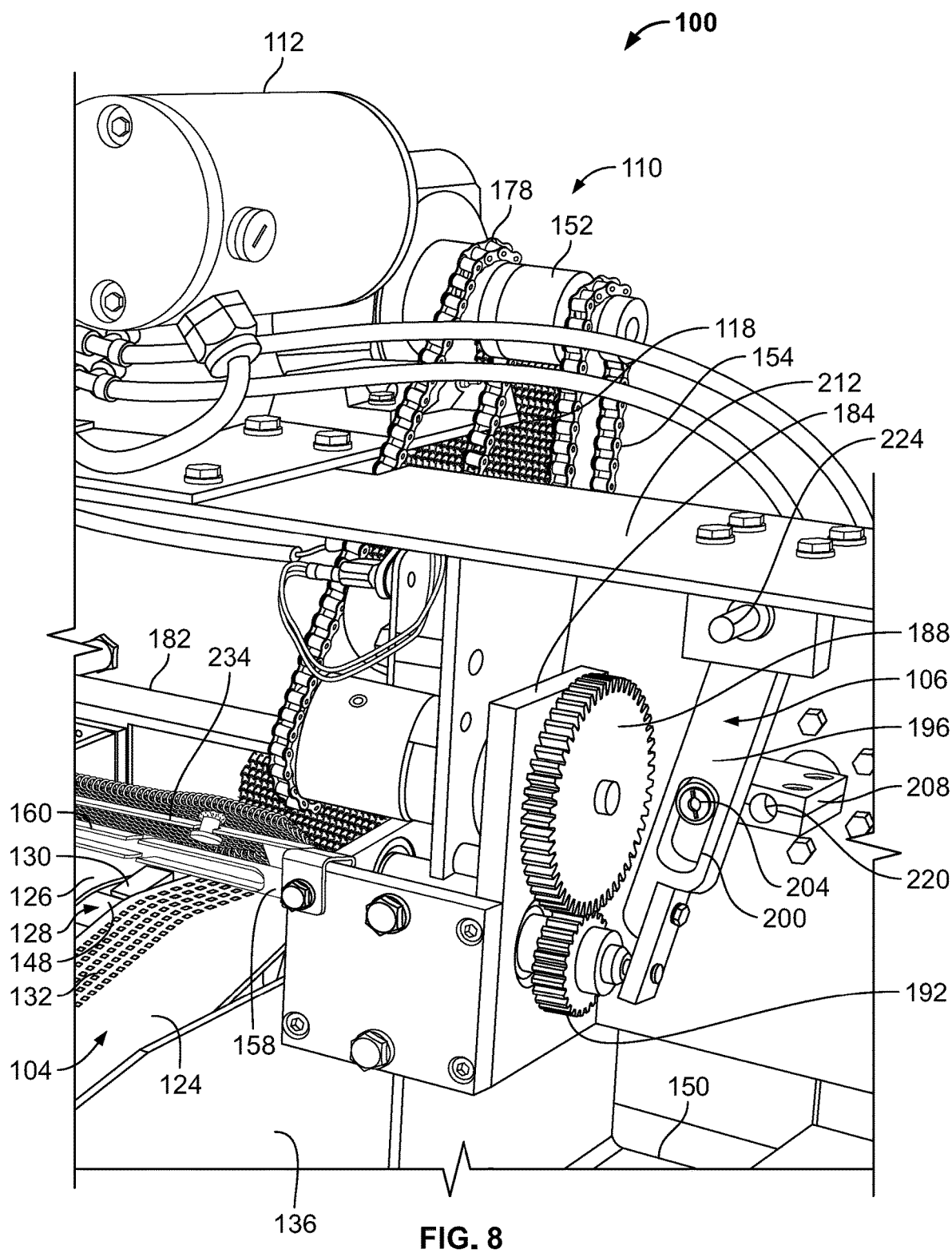
FIG. 8 is a detailed, front perspective view of a driving section of the example embodiment of FIG. 1.

Still with reference to FIGS. 5-8, each of the rolling elements 158, 160 defines a fork-shaped configuration including first and second prongs 162, 164 (e.g., upper and lower prongs) and a gap or space 166 between the prongs 162, 164. The rolling elements 158, 160 are spaced from each other by a central gap 168. The rolling elements 158, 160 are configured to receive a leading edge of the unrolled food product through the space 166 prior to rotation of the rolling elements 158, 160 for rolling of the food product. As shown in FIGS. 6 and 7, the lower prongs 164 of the rolling elements 158, 160 are disposed over the respective conveyor belts 124, 126, therefore elevating the space 166 over the top surface of the conveyor belts 124, 126. In particular, the space 166 is offset from the top surface of the conveyor belts 124, 126 by a vertical distance 176 (see, e.g., FIG. 7). As noted above, the apparatus 100 includes a biased platform 130 disposed between the conveyor belts 124, 126. The platform 130 generally defines a ramped, wedge or triangular shape with a proximal end 170 disposed below the top surface of the conveyor belts 124, 126 and a distal end 172 disposed above the top surface of the conveyor belts 124, 126.

The platform 130 can be spring-loaded by a spring assembly (not shown) disposed below the conveyor belts 124, 126, the spring assembly biasing the distal end 172 of the platform 130 in an upward direction and a position above the top surfaces of the conveyor belts 124, 126 (e.g., above a plane defined by the top surfaces of the conveyor belts 124, 126). Thus, in the normal or unloaded position of platform 130, the distal end 172 of the platform 130 is positioned higher than the lower prongs 164 of the rolling elements 158, 160 by a distance 174 (see, e.g., FIG. 7). In operation, as the leading edge of the unrolled food product passes over the platform 130, the upwardly ramped or angled structure of the platform 130 elevates the leading edge of the food product over the top surface of the conveyor belts 124, 126 and into the space 166 of the rolling elements 158, 160. Thus, the platform 130 assists in feeding the leading edge of the food product into the space 166 of the rolling elements 158, 160 prior to the rolling step of the apparatus 100.

As the transport section 104 continues to feed the food product towards the rolling mechanism 106, the weight of the food product imparts a force on the platform 130 and at least partially overcoming the biasing force from the spring assembly, thereby lowering the platform 130 below the normal or unloaded position of the platform 130. For example, in the loaded position of the platform 130, the distal end 172 can be forced downward to reduce the distance 174. In some embodiments, in the loaded position of the platform 130, the distal end 172 can be forced downward to a level, e.g., lower than the space 166, substantially aligned with the top surface of the conveyor belts 124, 126, or the like.

As shown in FIGS. 1-4, 8 and 9, the rolling mechanism 106 includes a revolving clutch assembly for actuating simultaneous rotation of the rolling elements 158, 160. The revolving clutch assembly includes the shaft 152 and a chain 178 coupled to a gear of the shaft 152 such that rotation of the shaft 152 actuates rotation of the chain 178. The chain 178 is coupled to a gear 180 of a shaft 182 extending above the transport section 104. The gear 180 is fixedly secured to the shaft 182 such that rotation of the gear 180 actuates simultaneous rotation of the shaft 182.

The shaft 182 rotatably mounts to and extends through support flanges 184, 186 disposed on opposing sides of the transport section 104. The shaft 182 includes gears 188, 190 on opposing sides of the shaft 182, and the revolving clutch assembly includes gears 192, 194 meshing with the gears 188, 190. The gears 192, 194 are coupled to the rolling elements 158, 160 such that rotation of the gears 192, 194 results in axial rotation of the rolling elements 158, 160. Thus, rotation of the shaft 152 results in rotation of the shaft 182 via gear 180, rotation of the shaft 182 results in rotation of the gears 188, 190, and rotation of the gears 188, 190 results in rotation of the gears 192, 194 which, in turn, rotates the rolling elements 158, 160. In some embodiments, the rolling elements 158, 160 can be actuated to rotate a full 360° one or more times until the food product is partially rolled.

Each of the rolling elements 158, 160 includes an elongated body extending through the flanges 184, 186 and concentrically through an opening within the gears 192, 194, with the ends of the rolling elements 158, 160 coupled to first and second lever arms 196, 198. Each lever arm 196, 198 includes an elongated, slotted opening 200, 202 formed therein. Each opening 200, 202 receives a pin 204, 206 connected to a bracket 208, 210. The brackets 208, 210 are rotatably mounted to support frames 212, 214. In particular, the apparatus 100 includes actuators 216, 218 mounted to the opposing side of the support frames 212, 214, and the actuators 216, 218 are connected to the controller 114.

Upon receiving a signal from the controller 114, the actuators 216, 218 simultaneously rotate the brackets 208, 210 about pivot shafts 220, 222. In some embodiments, brackets 208, 210 can each be rotated approximately 180°. The actuator 216 rotates the bracket 208 in a counterclockwise direction, and the actuator 218 rotates the bracket 210 in a clockwise direction. As the brackets 208, 210 rotate, the pins 204, 206 slide within the openings 200, 202 to urge the lever arms 196, 198 to rotate about pivot shafts 224, 226. In particular, sliding of the pin 204 within the opening 200 urges the lever arm 196 to rotate about the pivot shaft 224 in a counterclockwise direction, and sliding of the pin 206 within the opening 202 urges the lever arm 198 to rotate about the pivot shaft 226 in a clockwise direction.

Rotation of the lever arms 196, 198 laterally pulls the rolling elements 158, 160 into a position spaced from or laterally adjacent to the conveyor belts 124, 126. In particular, during the rolling operation of the rolling mechanism 106, the rolling elements 158, 160 are disposed over a portion of the respective conveyor belts 124, 126 (e.g., an active position). After the food product has been partially rolled, the rolling elements 158, 160 are laterally moved away from the conveyor belts 124, 126 (e.g., a retracted or inactive position).

As shown in the detailed view of FIG. 5, the sensor assembly 116 is disposed over the transport section 104 to detect movement of the food product on the conveyor belts 124, 126, and transmits signals associated with detection of the food product on the conveyor belts 124, 126 to the controller 114 to regulate and/or coordinate actuation of the rolling mechanism 106 and to laterally move the rolling elements 158, 160. The sensor assembly 116 generally includes a first sensor 228 and a second sensor 230 (e.g., position sensors) mounted over the conveyor belts 124, 126. In some embodiments, the sensors 228, 230 can be mounted to a flange 232, and the flange 232 can be coupled to one of the support frames 212, 214 such that the sensors 228, 230 are substantially aligned with the gap 128 between the conveyor belts 124, 126 (e.g., centered relative to the transport section 104). The flange 232 can include an elongated slot 238 along which the position of the sensors 228, 230 can be adjusted, thereby accommodating detection of food products of different dimensions.

The second sensor 230 can be disposed distally from the first sensor 228 (e.g., the first sensor 228 is disposed closer to the proximal end 120 and the second sensor 230 is disposed closer to the distal end 122). The sensors 228, 230 are used by the apparatus 100 to determine the position of the food product on the conveyor belts 124, 126 and, based on the detected position of the food product, determine when the rolling elements 158, 160 should be actuated to rotate and begin rolling of the food product. For example, when only the first sensor 228 detects the food product, such detection indicates that the leading edge of the food product has not yet reached the location below the second sensor 230 and the food product is well short of the rolling elements 158, 160. When both sensors 228, 230 detect the food product, such detection indicates that the leading edge of the food product has passed both sensors 228, 230 and not yet reached the rolling elements 158, 160, the food product still being short of the rolling elements 158, 160. When the second sensor 230 detects the food product and the first sensor 228 does not detect the food product, such detection indicates that the trailing edge of the food product has passed the first sensor 228 and, based on the size of the food product, the leading edge is at the rolling elements 158, 160. Particularly, such detection indicates to the apparatus 100 that the rolling elements 158, 160 should be actuated to roll to initiate rolling of the leading edge of the food product. Operation of the sensors 228, 230 is discussed in greater detail below.

The first sensor 228 and the second sensor 230 are configured to detect the leading edge of the food product in the unfolded configuration as the food product is fed on the conveyor belts 124, 126 in the direction of the rolling mechanism 106. Thus, the first sensor 228 detects the leading edge of the food product first, and the second sensor 230 detects the leading edge of the food product after the leading edge has passed under the first sensor 228 (and while the first sensor 228 continues to detect the central portion of the food product between the leading and trailing edges). The rolling elements 158, 160 remain stationary (e.g., are not actuated to roll/rotate and remain over the conveyor belts 124, 126 in preparation for receiving the leading edge of the food product) when both the first and second sensors 228, 230 detect the unfolded food product passing on the conveyor belts 124, 126.

Based on the dimensions of the food product in the unfolded configuration programmed into the controller 114, the time period or window in which the trailing edge of the food product passes beyond the first sensor 228 and the food product is only detected by the second sensor 230 substantially corresponds with the leading edge of the food product entering the space 166 of the rolling elements 158, 160. Particularly, the position of the sensors 228, 230 over the conveyor belts 124, 126 is selected based on the length of the food product, such that when the trailing edge of the food product is between the first and second sensors 228, 230, the leading edge of the food product is in the space 166 of the rolling elements 158, 160. It should be understood that the position or distance of the sensors 228, 230 relative to the rolling elements 158, 160 can be adjusted depending on the length or size of the food product.

Thus, upon detection of the food product with the second sensor 230 (and loss of detection of the food product by the first sensor 228), the controller 114 actuates the rolling elements 158, 160 to axially rotate, thereby partially rolling the food product. The combination of the first and second sensors 228, 230 therefore ensures that the rolling mechanism 106 is actuated to rotate the rolling elements 158, 160 only after the trailing edge of the food product has passed beyond the first sensor 228 and is still detected by the second sensor 230. While the food product is only partially rolled (e.g., a partially rolled configuration), the controller 114 actuates lateral movement of the rolling elements 158, 160 to position the rolling elements 158, 160 in the retracted or inactive position.

After retraction of the rolling elements 158, 160 (see, e.g., FIG. 9), the conveyor belts 124, 126 continue to rotate, urging the partially folded food product towards the distal end 122 of the apparatus 100. The retention mechanism 118 can be in the form of a metal mesh and/or belt loosely resting over the conveyor belts 124, 126 from the central roller 148 to a point near the distal roller 142. In some embodiments, one end of the retention mechanism 118 can be coupled to a support frame 234 disposed over the rolling mechanism 106, and the opposing end of the retention mechanism 118 can be coupled to a support frame 236 near the rear of the motor 112. The weight of the retention mechanism 118 maintains pressure on the partially rolled food product after the rolling elements 158, 160 have been laterally retracted, thereby sandwiching the food product between the retention mechanism 118 and the conveyor belts 124, 126. With the pressure from the retention mechanism 118, movement of the conveyor belts 124, 126 continues rolling the food product until a fully rolled configuration of the food product is achieved.

The rolling mechanism 106 therefore only rolls the food product into a partially rolled food product, and the partially rolled food product is rolled into the fully rolled food product with the conveyor belts 124, 126 and the retention mechanism 118. After fully rolling the food product, the conveyor belts 124, 126 continue to move the food product to the distal end 122 of the apparatus 100, where the food product can be collected in a collection bin (not shown). In some embodiments, the food product is rolled into the fully rolled configuration as the food product is moved from the area near the central roller 148 to the distal end 122 of the apparatus 100. In some embodiments, a collection or take-away conveyor system (not shown) can be disposed near the distal end 122 of the apparatus 100 such that output of the rolled food products can be transferred to a collection or packaging area by the collection conveyor system.

The partial rolling of the food product with the rolling mechanism 106 and completion of rolling the food product into the fully rolled configuration with the conveyor belts 124, 126 and the retention mechanism 118 provides several advantages. For example, control of the food product is provided all of the way from the rolling mechanism 106 to the distal end 122 of the apparatus 100, ensuring that the food product does not unroll (even partially) before discharge from the distal end 122. As a further example, the separate rolling steps of the food product are not dependent on the potentially varying length of the individual food products that make up the final food product (e.g., the length of a slice of meat and slice of cheese). The rolling mechanism 106 can be pre-programmed for a specific number of revolutions. By not completing the full rolling of the food product with the rolling mechanism 106, rolling of a food product that is longer than normal can still be completed by the conveyor belts 124, 126 and the retention mechanism 118. Particularly, the final rolling step of using the conveyor belts 124, 126 and the retention mechanism 118 is not dependent on the length of the food product and ensures that food products of all lengths are fully rolled, while also keeping the food product tightly rolled until the food product has been discharged from the distal end 122 of the apparatus 100.

Figure 10:
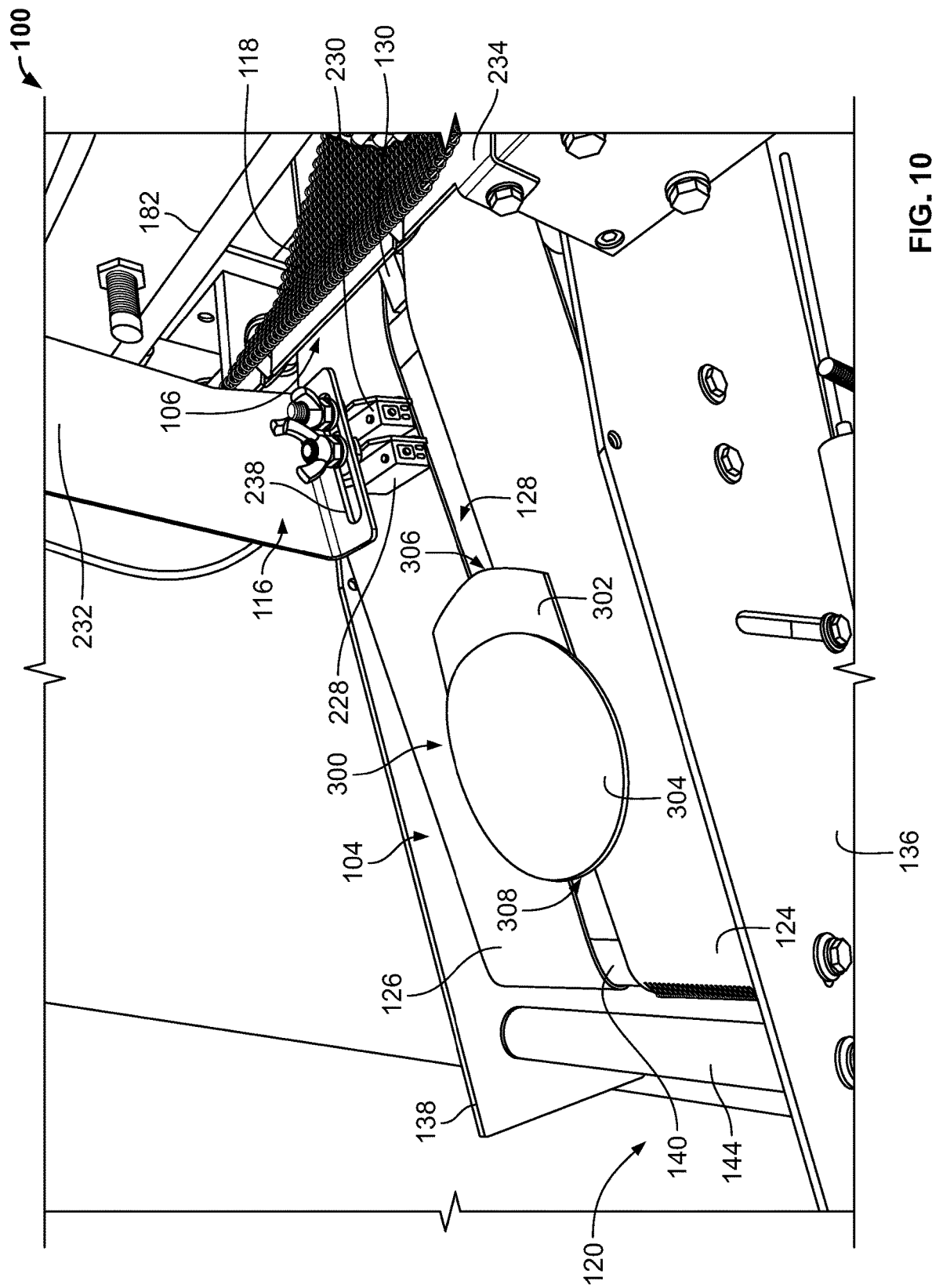
FIG. 10 is a detailed, front perspective view of the example embodiment of FIG. 1, including an unfolded food product disposed on a transport section proximally from a sensor assembly and a rolling mechanism.
Figure 11:
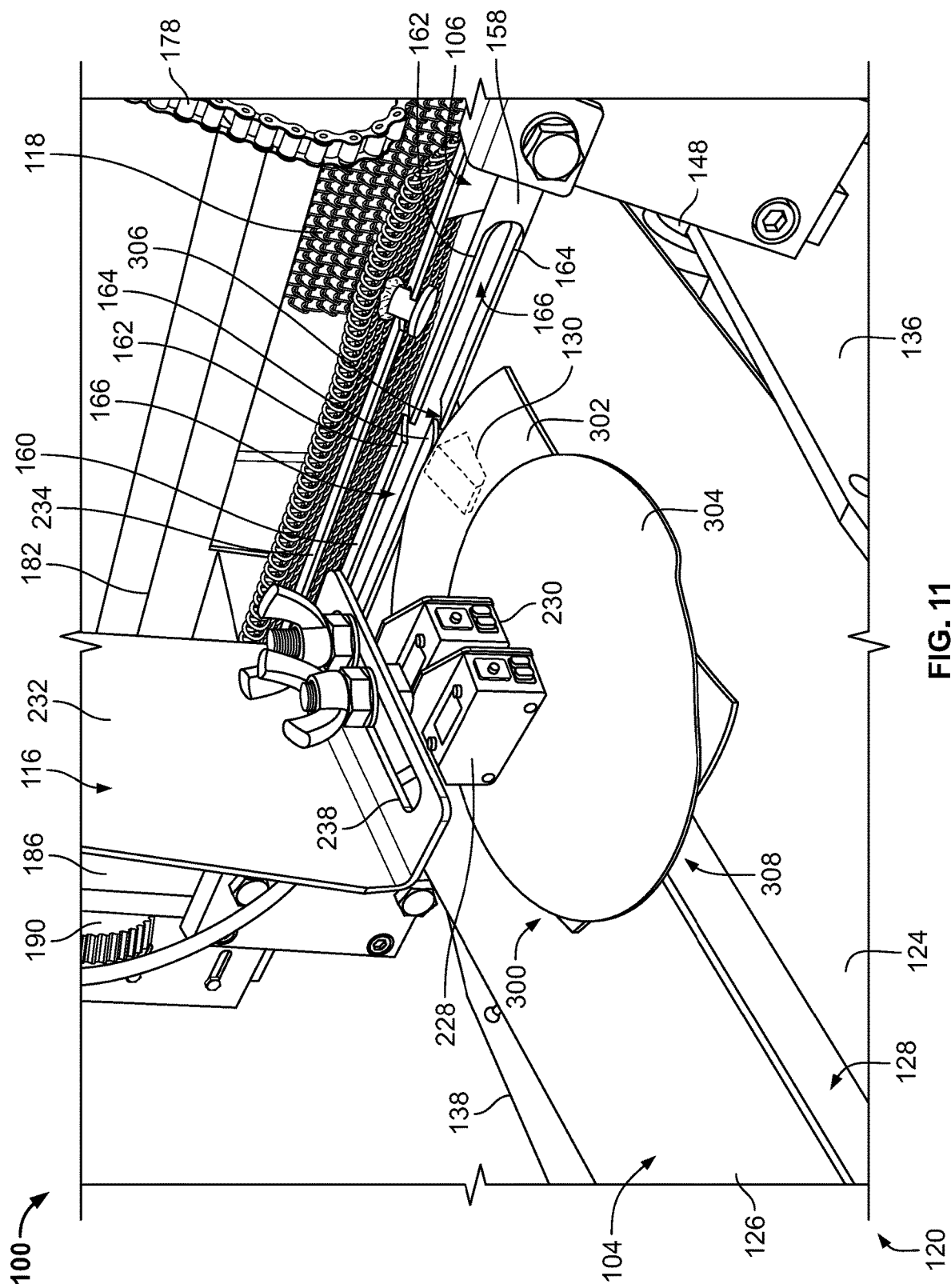
FIG. 11 is a detailed, front perspective view of the example embodiment of FIG. 1, including an unfolded food product disposed on a transport section underneath a sensor assembly and proximally from a rolling mechanism.
Figure 12:
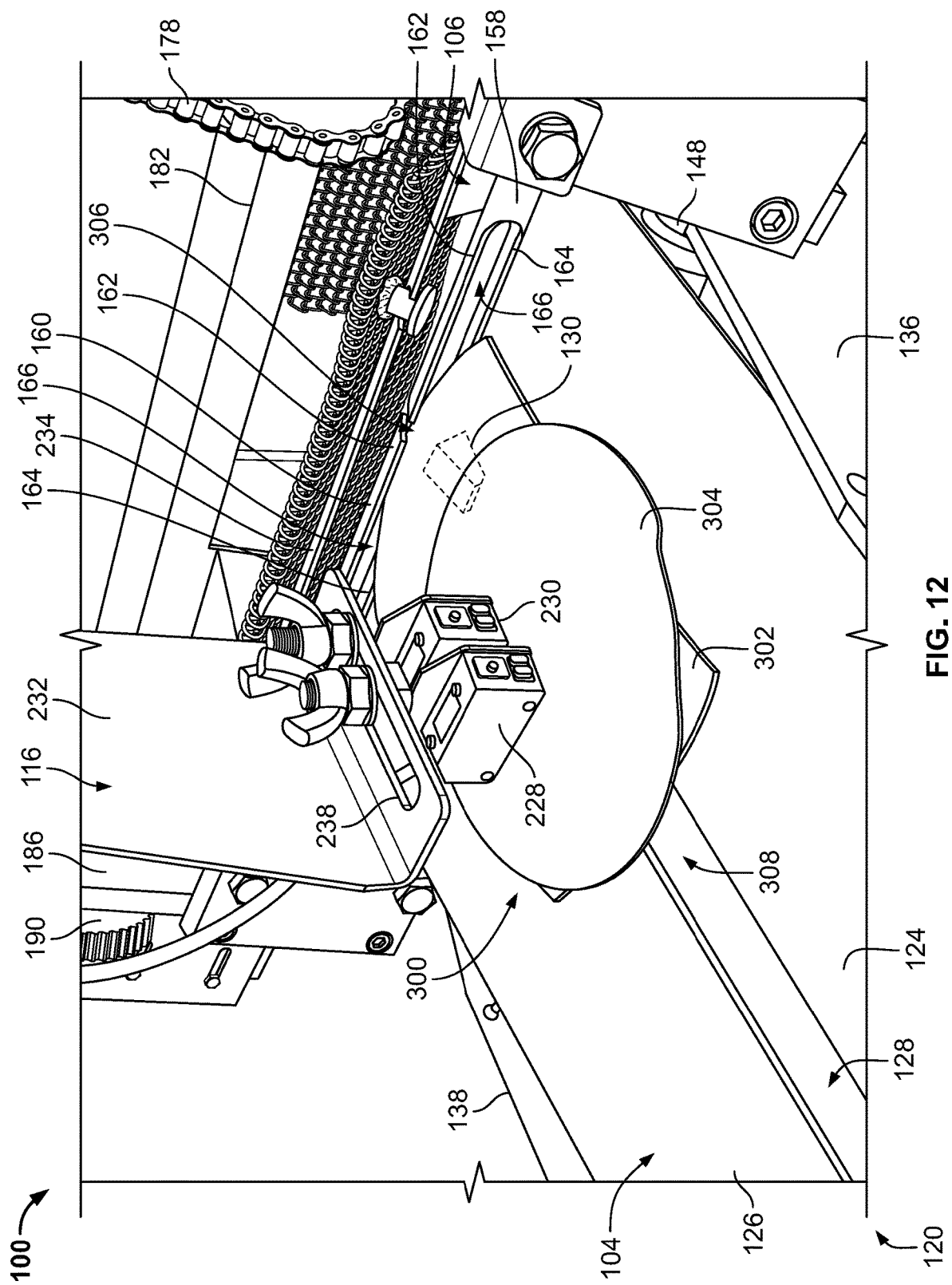
FIG. 12 is a detailed, front perspective view of the example embodiment of FIG. 1, including a leading edge of an unfolded food product disposed in a channel of a rolling mechanism.
Figure 13:
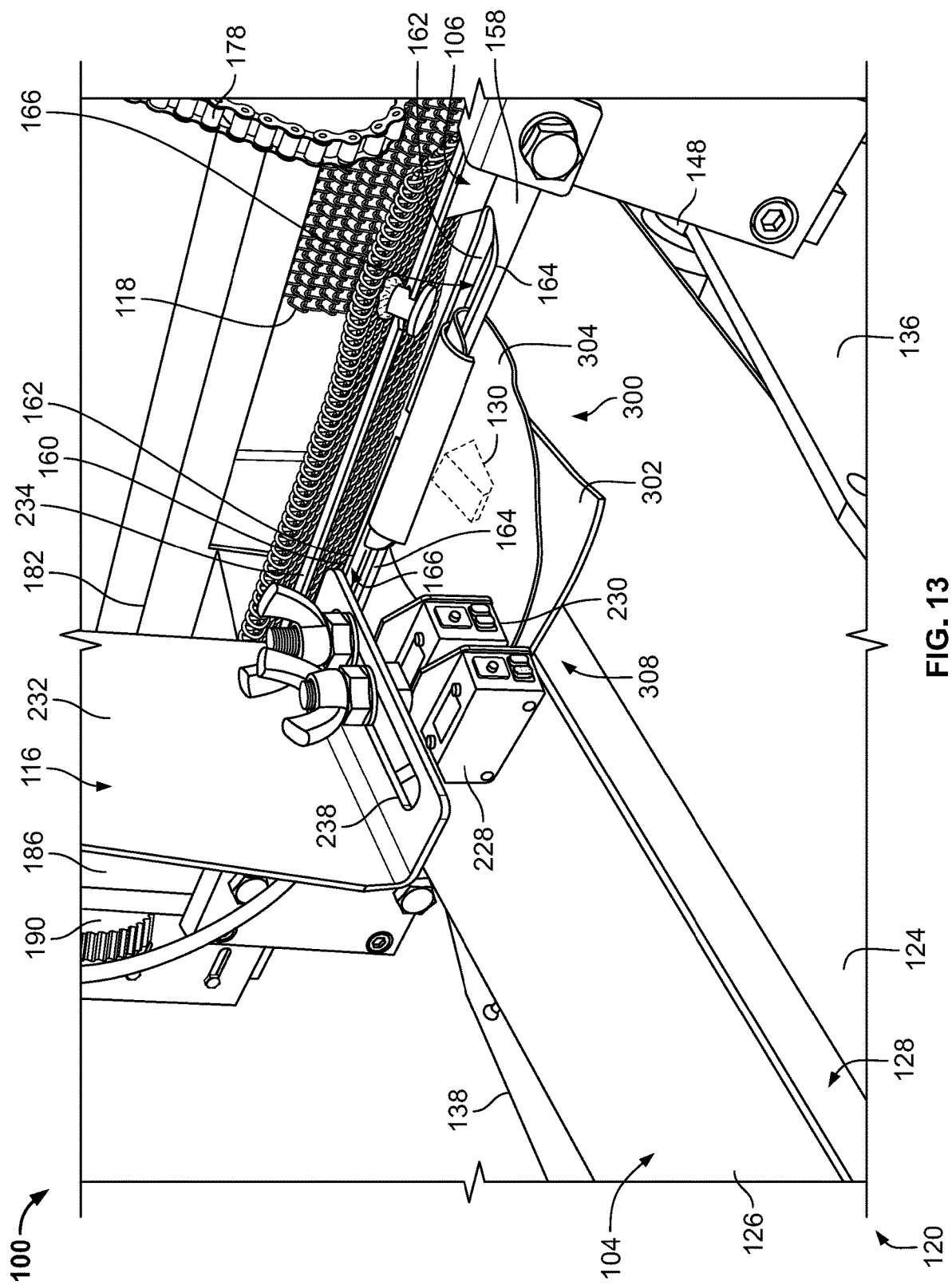
FIG. 13 is a detailed, front perspective view of the example embodiment of FIG. 1, including a rolling mechanism in an initial turn of a rotation cycle.
Figure 14:
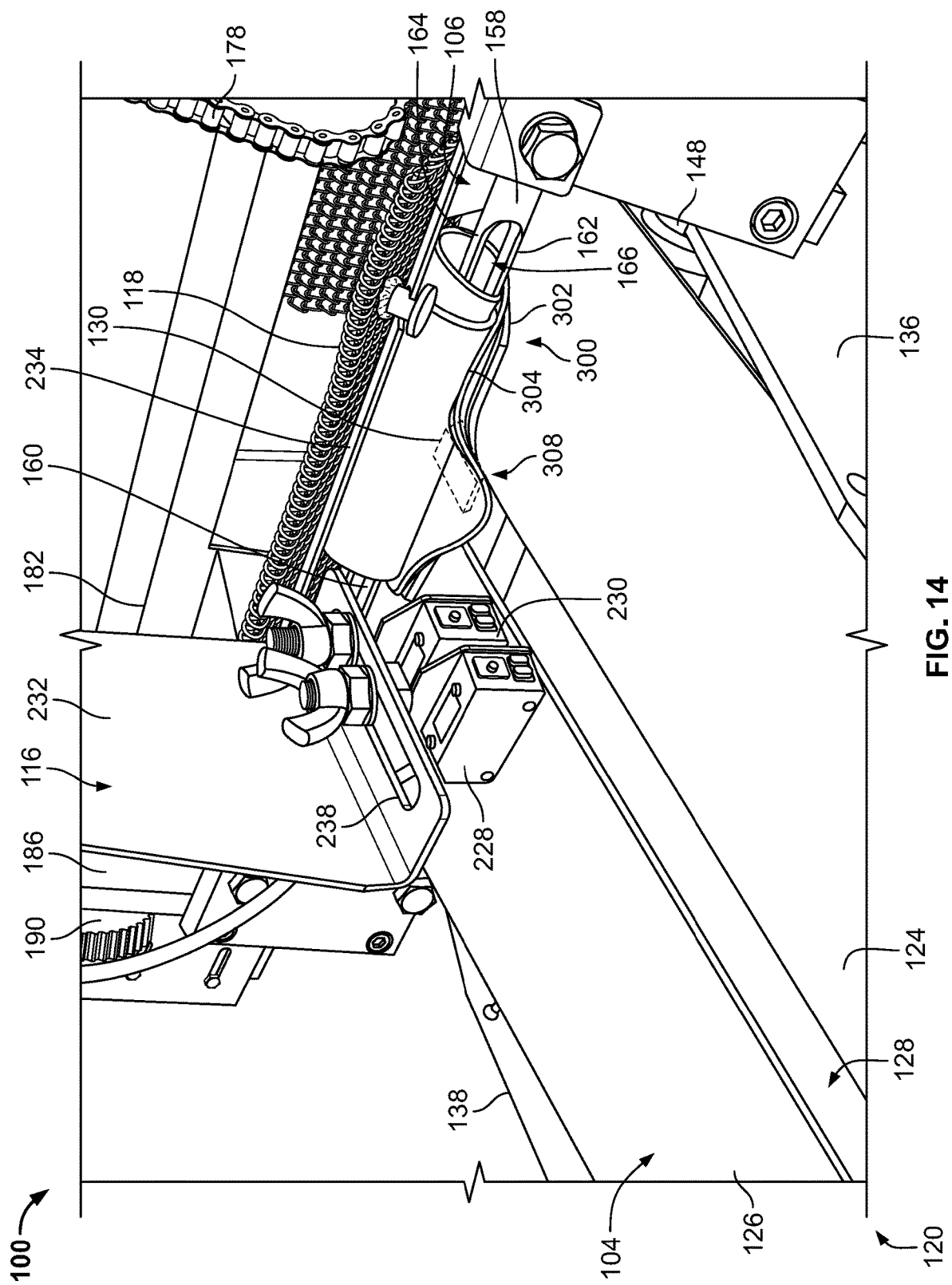
FIG. 14 is a detailed, front perspective view of the example embodiment of FIG. 1, including a rolling mechanism in a rotation cycle with a partially rolled food product.
Figure 15:
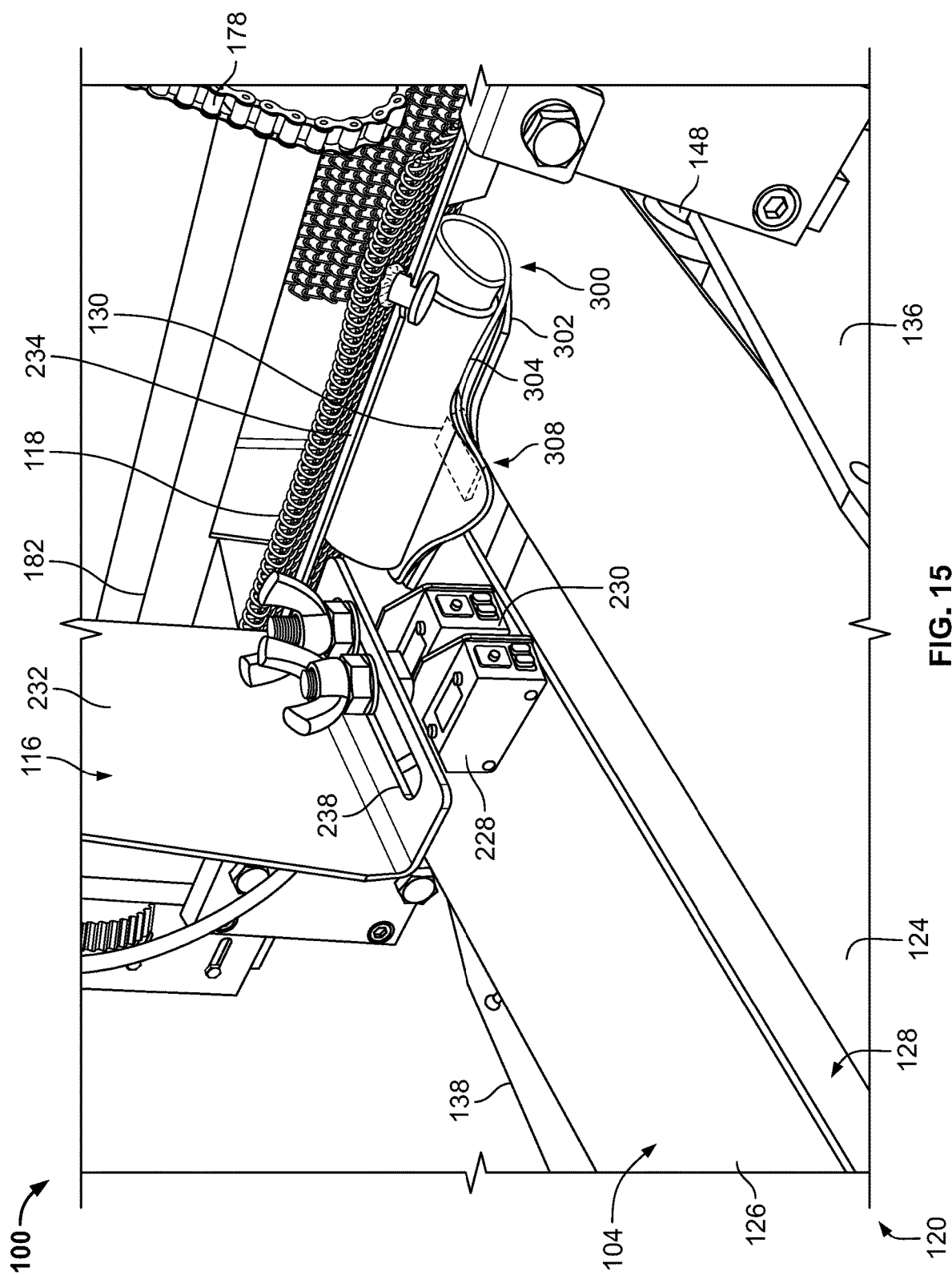
FIG. 15 is a detailed, front perspective view of the example embodiment of FIG. 1, including a rolling mechanism with a partially rolled food product and rolling elements actuated into laterally retracted positions.
Figure 16:
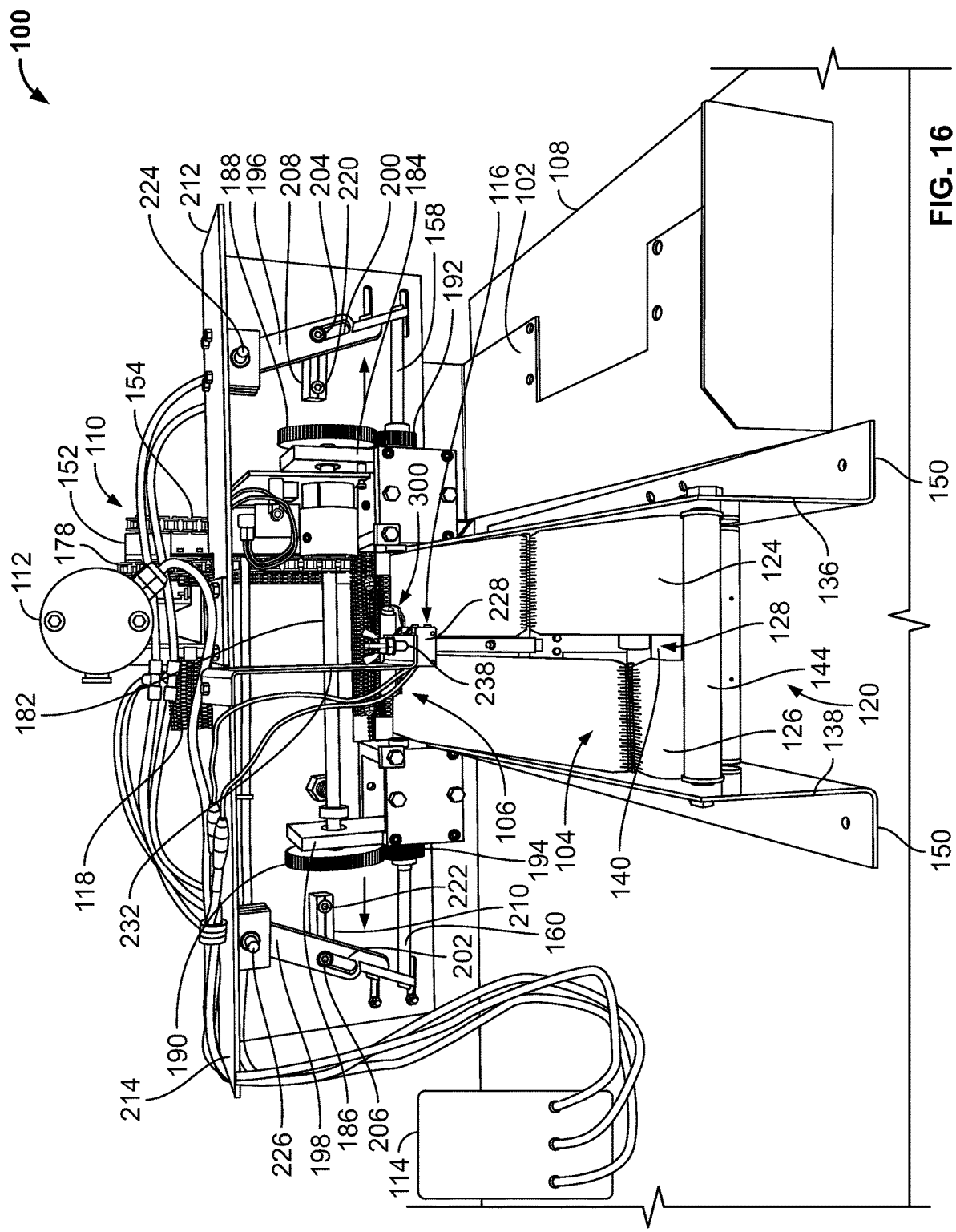
FIG. 16 is a front view of the example embodiment of FIG. 1, including a rolling mechanism with a partially rolled food product and rolling elements actuated into laterally retracted positions.
Figure 17:
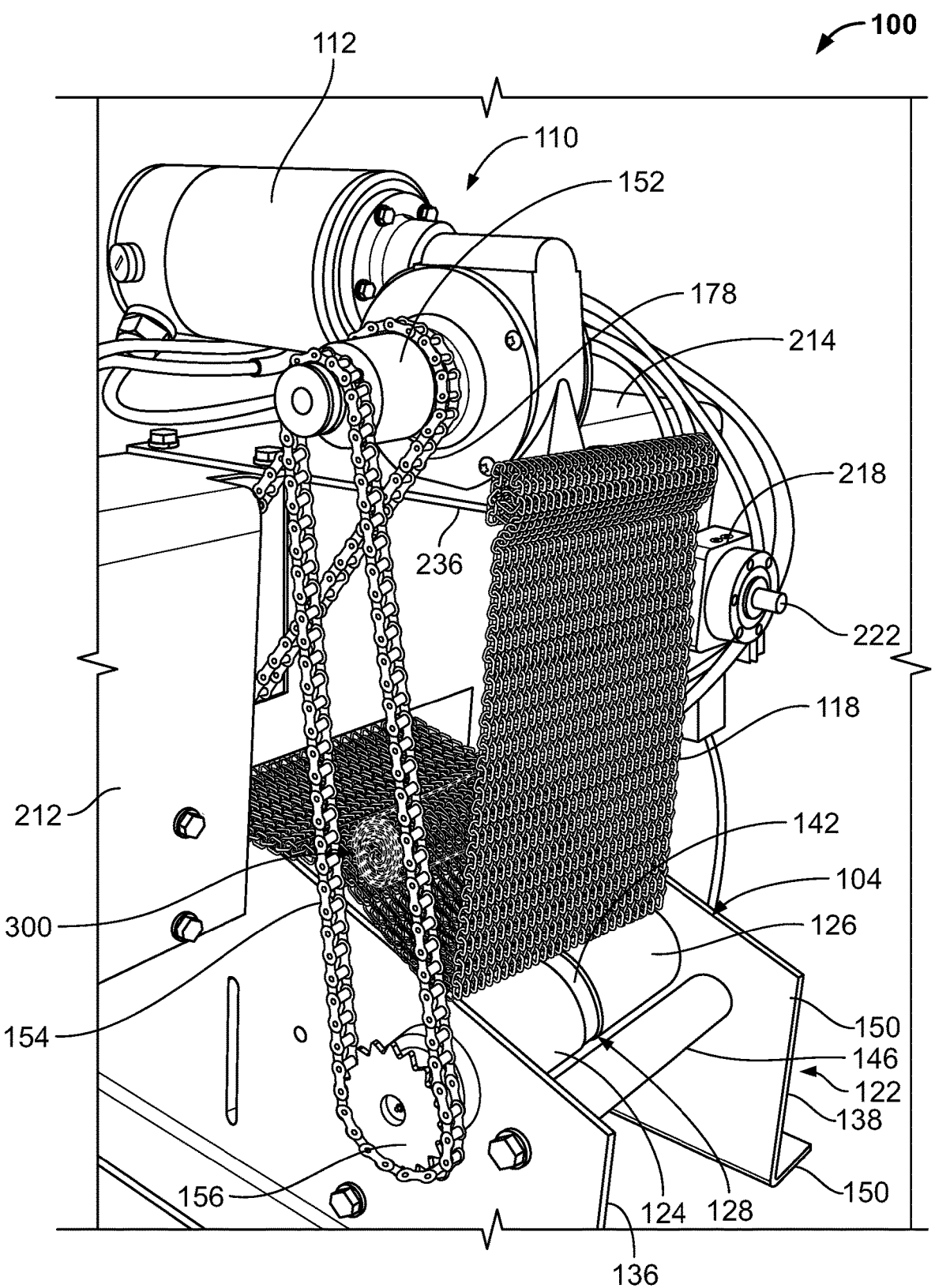
FIG. 17 is a rear perspective view of the example embodiment of FIG. 1, including a rolled food product disposed between a conveyor belt assembly and a retention mechanism.

FIGS. 10-17 show different actuation stages of the apparatus 100 for rolling the food product 300. In particular, FIGS. 10-12 show the food product 300 prior to initiation of the rolling process, FIGS. 13-14 show the food product 300 rolled into the partially rolled configuration with the rolling elements 158, 160 in the active position, FIGS. 15 and 16 show the partially rolled food product 300 with the rolling elements 158, 160 retracted, and FIG. 17 shows the final rolling stage of the food product 300 into the fully rolled configuration.

As shown in FIG. 10, the food product 300 is initially positioned in an unrolled configuration at or near the proximal end 120 of the apparatus 100. The food product 300 can include one or more slices of a food, such as meat, cheese, or the like. In the illustrative embodiment shown in FIG. 10, the food product 300 includes a single slice of meat 302 and a single slice of cheese 304. However, it should be understood that multiple slices of similar or alternative foods can be used. The food product 300 includes a leading edge 306 and a trailing edge 306. In some embodiments, the slices of meat and cheese 302, 304 can be aligned at both the leading edge 306 and trailing edge 308.

In FIG. 10, the food product 300 is disposed on the conveyor belts 124, 126 proximally of the sensor assembly 116. As the food product 300 passes under the sensor assembly 116, the first and second sensors 228, 230 sequentially detect the leading edge 306 of the food product 300. As the leading edge 306 continues to move by the conveyor belts 124, 126 in the direction of the rolling elements 158, 160, the first and second sensors 228, 230 continue to detect the central portion of the food product 300 (between the leading and trailing edges 306, 308). FIG. 11 shows the central portion of the food product 300 on the conveyor belts 224, 226 at a position underneath the sensor assembly 116 and proximal from the rolling mechanism 106. In particular, the leading edge 306 of the food product 300 passes over the biased platform 130 which elevates the leading edge 306 above the conveyor belts 124, 126 and into the space 166 of the rolling elements 158, 160. The food product 300 is therefore in direct contact with the biased platform 130 as it progresses on the conveyor belts 124, 126 (e.g., no conveyor belts between the biased platform 130 and the food product 300). FIG. 12 shows the leading edge 306 of the food product 300 urged into the space 166 of the rolling elements 158, 160 by movement of the conveyor belts 124, 126.

Based on the length or dimensions of the food product 300 as measured between the leading and trailing edges 306, 308, the first sensor 228 is positioned such that when the trailing edge 308 of the food product 300 is positioned between the first sensor 228 and the second sensor 230, the leading edge 306 of the food product has been introduced into the space 166 of the rolling elements 158, 160. The detection of the food product 300 by both the first and second sensors 228, 230 therefore indicates that the leading edge 306 has not been introduced into the space 166. Detection of the food product 300 by only the second sensor 230 while the first sensor 228 fails to detect the food product 300 (e.g., the first sensor 228 detects only the conveyor belt 124, 126) indicates that the trailing edge 308 is located between the first and second sensors 228, 230 and the leading edge is in the space 166 of the rolling elements 158, 160.

Therefore, upon detection of the conveyor belt 124, 126 only (without the food product 300) by the first sensor 228 and continued detection of the food product 300 with the second sensor 230 (e.g., indicating that the trailing edge 308 of the food product 300 is between the first and second sensors 228, 230), one or more signals are transmitted to the controller 114 which, in turn, actuates rotation of the rolling elements 158, 160 to perform a predetermined number of rotations for the rolling elements 158, 160. The sensor assembly 116 therefore acts as the timing mechanism for the apparatus 100 for coordinating and synchronizing the rolling and retraction steps. In addition, as the food product 300 passes over the biased platform 130, the weight of the food product 300 pushes the platform 130 to a lower elevation (e.g., substantially aligned with the top surfaces of the conveyor belts 124, 126).

FIG. 13 shows the trailing edge 308 disposed distally relative to the first sensor 228, and the rolling elements 158, 160 axially rotating in a counter-clockwise direction (when viewed from the right side of the apparatus 100) after rolling of the food product 300 has been initiated. The rolling elements 158, 160 continue to axially rotate for a predetermined or preprogrammed number of cycles until the food product 300 has been rolled into a partially rolled configuration, as shown in FIG. 14. It is noted that during the rolling procedure, the leading edge 306 is disposed in the space 166 of the rolling elements 158, 160, while the remaining portions of the food product 300 are rolled around the outer surfaces of the rolling elements 158, 160.

After the food product 300 has been rolled into a partially rolled configuration, the controller 114 actuates lateral movement of the rolling elements 158, 160 to position the rolling elements 158, 160 in a retracted position. Retraction of the rolling elements 158, 160 disengages the food product 300 to allow for the food product 300 to progress to the distal end 122. In some embodiments, during the retraction step of the rolling elements 158, 160, the conveyor belts 124, 126 can be actuated into a stopped position and, once the rolling elements 158, 160 have been retracted, the conveyor belts 124, 126 can be actuated into a moving position. In some embodiments, the conveyor belts 124, 126 can continue to move during the retraction step of the rolling elements 158, 160. During the retraction step, the rolling elements 158, 160 are actuated to translate laterally outward and away from the conveyor belts 124, 126. FIGS. 15 and 16 show the food product 300 in a partially rolled configuration with the rolling elements 158, 160 retracted away from the conveyor belts 124, 126 (e.g., to the respective sides of the conveyor belts 124, 126). With the rolling elements 158, 160 retracted, the food product 300 remains on the conveyor belts 124, 126 without support from the rolling elements 124, 126. However, the retention mechanism 118 provides pressure over the partially rolled food product 300.

Figure 18:
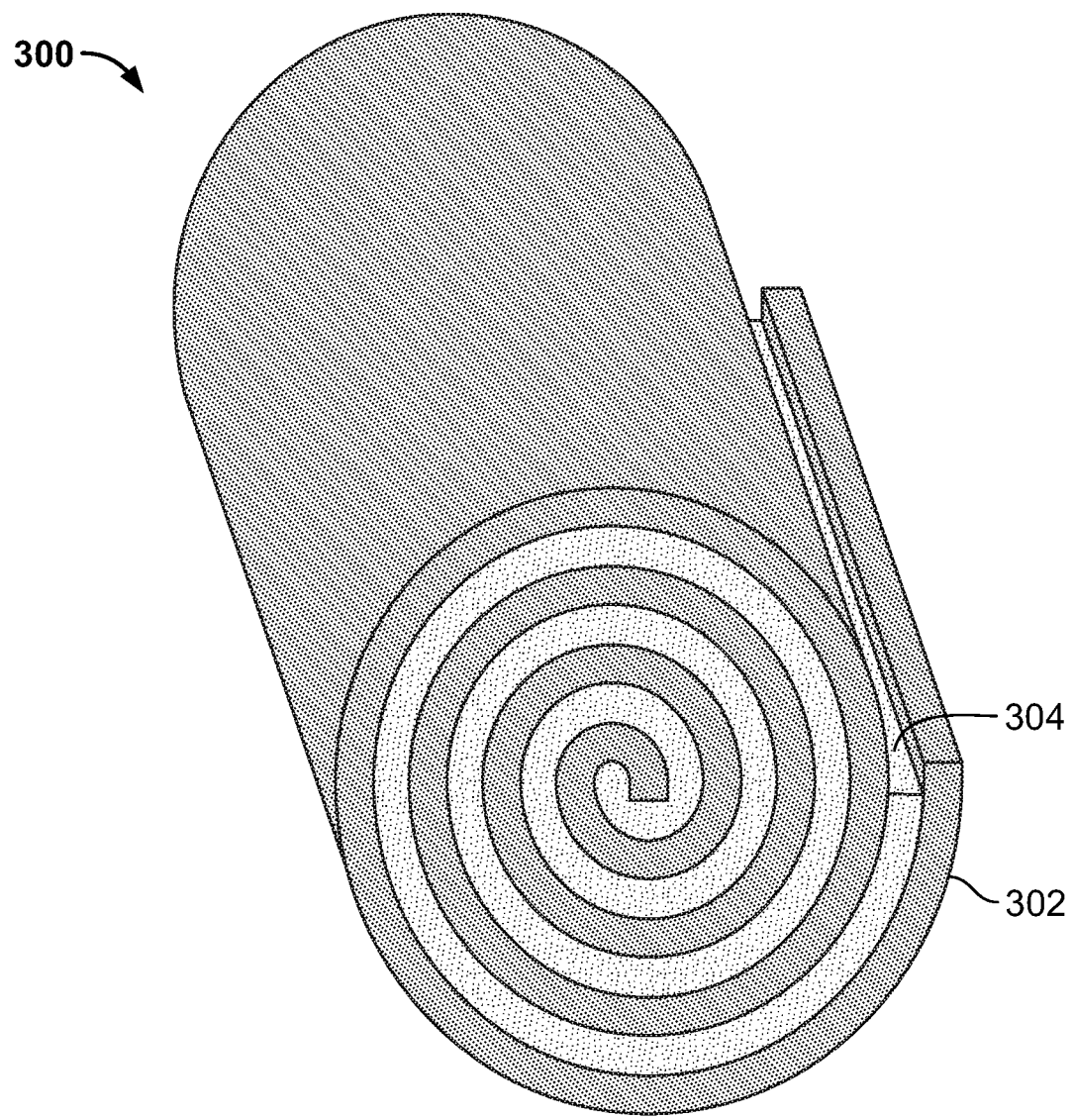
FIG. 18 is a perspective view of an example embodiment of a rolled food product.

As shown in FIG. 17, with the weight of the retention mechanism 118 on the partially rolled food product 300 and the continued rotation of the conveyor belts 124, 126, the conveyor belts 124, 126 axially roll the food product 300 as the food product 300 travels along the conveyor belts 124, 126 towards the distal end 122. Thus, the retention mechanism 118 and the conveyor belts 124, 126 operate in combination to complete rolling of the food product into the fully rolled configuration. FIG. 18 shows a perspective view of an exemplary food product 300 in a fully rolled configuration. The exemplary apparatus 100 therefore provides for an efficient and effective means for forming a rolled food product 300.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. An apparatus for forming a rolled food product, comprising:
   a transport section configured to receive a food product in an unrolled configuration; and
   a rolling mechanism including rolling elements positionable between an active position in which the rolling elements are disposed over at least a portion of the transport section, and a retracted position in which the rolling elements are actuated away from the transport section;
   wherein the transport section is configured to feed the food product in the unrolled configuration to the rolling mechanism;
   wherein the rolling mechanism is configured to engage the food product with the rolling elements in the active position and roll the food product to form a partially rolled food product having a first one or more rotations, and the rolling elements are disengaged from the partially rolled food product when in the retracted position; and
   wherein the transport section is configured to roll the partially rolled food product when the rolling mechanism is in the retracted position to form a fully rolled food product having a second or more rotations, and rolling of the partially rolled food product into the fully rolled food product is completed by the transport section.

2. The apparatus according to claim 1, wherein positioning of the rolling elements from the active position to the retracted position comprises actuating the rolling elements to laterally move away from the transport section and from each other.

3. The apparatus according to claim 1, wherein the transport section comprises a conveyor belt assembly including a first conveyor belt and a second conveyor belt.

4. The apparatus according to claim 3, wherein the first and second conveyor belts are disposed adjacent to each other with a gap therebetween, the first and second conveyor belts extending from a proximal end to a distal end of the apparatus.

5. The apparatus according to claim 1, wherein the rolling mechanism comprises first and second lever arms disposed on opposing sides of the transport section.

6. The apparatus according to claim 5, wherein the rolling elements are rotatably coupled to the respective first and second lever arms.

7. The apparatus according to claim 6, comprising a controller configured to coordinate rotation of the first and second lever arms about respective pivot points to position the rolling elements in the active position or the retracted position.

8. The apparatus according to claim 1, wherein the rolling elements each comprise a fork-shaped element including two prongs and a space between the two prongs.

9. The apparatus according to claim 1, comprising a sensor assembly disposed over the transport section.

10. The apparatus according to claim 9, wherein the sensor assembly comprises a first sensor and a second sensor, the second sensor disposed distally from the first sensor.

11. The apparatus according to claim 10, wherein the first and second sensors sequentially detect a leading edge of the food product in the unrolled configuration during feeding by the transport section.

12. The apparatus according to claim 11, wherein the second sensor detects the food product in the unrolled configuration during feeding by the transport section after a trailing edge has passed below the first sensor, detection of the food product by only the second sensor corresponding with the leading edge of the food product being at the rolling elements.

13. The apparatus according to claim 3 comprising a biased platform disposed proximally from the rolling mechanism and between the first and second conveyor belts of the transport section.

14. The apparatus according to claim 13, wherein the biased platform is positionable in a first position prior to loading with the food product, a trailing edge of the biased platform being disposed higher than a lower prong of the rolling elements in the first position.

15. The apparatus according to claim 14, wherein the biased platform is positionable in a second position after loading with the food product, the trailing edge of the biased platform being disposed equal to or lower than the lower prong of the rolling elements in the second position.

16. The apparatus according to claim 1, comprising a retention mechanism disposed over a distal end of the transport section, the retention mechanism maintaining pressure on the food product to assist the transport section in completing rolling of the food product into the fully rolled food product.

17. An apparatus for forming a rolled food product, comprising:
   a transport section configured to receive a food product in an unrolled configuration; and
   a rolling mechanism including rolling elements positionable between an active position in which the rolling elements are disposed over at least a portion of the transport section, and a retracted position in which the rolling elements are actuated laterally away from the transport section;
   wherein the transport section is configured to feed the food product in the unrolled configuration to the rolling mechanism;
   wherein the rolling mechanism is configured to engage the food product with the rolling elements in the active position and roll the food product to form a partially rolled food product having a first one or more rotations, and the rolling elements are configured to be actuated into the retracted position while the food product is in the partially rolled food product configuration to disengage the rolling elements from the partially rolled food product; and wherein the transport section is configured to roll the partially rolled food product when the rolling mechanism is in the retracted position to form a fully rolled food product having a second one or more rotations, and rolling of the partially rolled food product into the fully rolled food product is completed by the transport section.

* * * * *